US010121321B2

(12) United States Patent
Irwin et al.

(10) Patent No.: US 10,121,321 B2
(45) Date of Patent: Nov. 6, 2018

(54) SYSTEM AND METHOD FOR USING CONDITIONAL PROBABILITIES TO ENHANCE GAMING PAYOUTS

(71) Applicant: Diamond Game Enterprises, Chatsworth, CA (US)

(72) Inventors: Kenneth E. Irwin, Dawsonville, GA (US); Robert J. Siemasko, Las Vegas, NV (US); James A. Breslo, Pacific Palisades, CA (US)

(73) Assignee: Diamond Game Enterprises, Chatsworth, CA (US)

( * ) Notice: Subject to any disclaimer, the term of this patent is extended or adjusted under 35 U.S.C. 154(b) by 370 days.

(21) Appl. No.: 15/209,343

(22) Filed: Jul. 13, 2016

(65) Prior Publication Data

US 2017/0103611 A1 Apr. 13, 2017

Related U.S. Application Data

(60) Provisional application No. 62/240,301, filed on Oct. 12, 2015.

(51) Int. Cl.
*G06F 17/00* (2006.01)
*G07F 17/32* (2006.01)

(52) U.S. Cl.
CPC ........ *G07F 17/3258* (2013.01); *G07F 17/329* (2013.01)

(58) Field of Classification Search
None
See application file for complete search history.

(56) References Cited

U.S. PATENT DOCUMENTS

| | | | |
|---|---|---|---|
| 5,048,833 | A | 9/1991 | Lamle |
| 5,249,800 | A | 10/1993 | Hilgendorf et al. |
| 5,280,909 | A | 1/1994 | Tracy |
| 5,951,011 | A | 9/1999 | Potter et al. |
| 5,980,385 | A | 11/1999 | Clapper, Jr. |
| 6,565,436 | B1 | 5/2003 | Baerlocher |
| 6,588,747 | B1 | 7/2003 | Seelig |
| 6,793,219 | B2 | 9/2004 | Higginson |
| 6,827,646 | B2 | 12/2004 | Adams |
| 7,074,127 | B2 | 7/2006 | Cuddy et al. |
| 7,201,657 | B2 | 4/2007 | Baerlocher et al. |
| 7,213,811 | B2 | 5/2007 | Bozeman |
| 7,407,436 | B2 | 8/2008 | Groz |
| 7,635,302 | B2 | 12/2009 | Wright |
| 7,635,304 | B2 | 12/2009 | Wright |

(Continued)

*Primary Examiner* — Paul A D'Agostino
(74) *Attorney, Agent, or Firm* — Panitch Schwarze Belisario & Nadel LLP

(57) ABSTRACT

A plurality of variable jackpot tickets having a predefined expected value and a plurality of predetermined non-jackpot winning tickets are provided in a deal of tickets preprinted with game content. A first random number generator using a first prize table selects physical locations in the deal of tickets for the plurality of predetermined non-jackpot winning tickets, and the plurality of variable jackpot tickets. A second random number generator using a second prize table different than the first prize table selects a jackpot prize for each of the plurality of variable jackpot tickets. Some of the jackpot prizes in the second prize table are less than the expected value. The difference between some of the jackpot prizes in the second prize table and the expected value are used to fund one or more jackpot prizes that are greater than the expected value.

30 Claims, 13 Drawing Sheets

| Tier Level | Win Type | Win Amount | Winner Every | Probability |
|---|---|---|---|---|
| 1 | Jackpot Win | $600.00 | 240,000.00 | 0.00042% |
| 2 | Normal Win | $43.40 | 480,000.00 | 0.00021% |
| 3 | Normal Win | $32.30 | 480,000.00 | 0.00021% |
| 4 | Normal Win | $28.60 | 480,000.00 | 0.00021% |
| 5 | Normal Win | $26.00 | 480,000.00 | 0.00021% |
| ... | | | | |
| 140 | Normal Win | $4.90 | 10,000.00 | 0.0100% |
| 141 | Normal Win | $4.80 | 9,411.76 | 0.01063% |
| 142 | Normal Win | $4.70 | 8,727.27 | 0.01146% |
| 143 | Normal Win | $4.60 | 4,403.67 | 0.02271% |
| 144 | Normal Win | $4.50 | 2,727.27 | 0.03667% |
| 145 | Normal Win | $4.40 | 3,018.87 | 0.03313% |
| 146 | Normal Win | $4.30 | 3,057.32 | 0.03271% |
| 147 | Normal Win | $4.20 | 3,157.89 | 0.03167% |
| 148 | Normal Win | $4.10 | 1,578.95 | 0.06333% |
| 149 | Normal Win | $4.00 | 581.82 | 0.17188% |
| 150 | Normal Win | $3.90 | 17,777.78 | 0.00563% |
| 151 | Normal Win | $3.80 | 12,307.69 | 0.00813% |
| 152 | Normal Win | $3.70 | 10,909.09 | 0.00917% |
| 153 | Normal Win | $3.60 | 6,956.52 | 0.01438% |
| 154 | Normal Win | $3.50 | 6,486.49 | 0.01542% |
| 155 | Normal Win | $3.40 | 6,666.67 | 0.0150% |
| 156 | Normal Win | $3.30 | 4,615.38 | 0.02167% |
| 157 | Normal Win | $3.20 | 4,000.00 | 0.0250% |
| 158 | Normal Win | $3.10 | 2,171.95 | 0.04604% |
| 159 | Normal Win | $3.00 | 1,853.28 | 0.05396% |
| 160 | Normal Win | $2.90 | 1,050.33 | 0.09521% |
| 161 | Normal Win | $2.80 | 1,441.44 | 0.06938% |
| 162 | Normal Win | $2.70 | 681.82 | 0.14667% |
| 163 | Normal Win | $2.60 | 445.27 | 0.22458% |
| 164 | Normal Win | $2.50 | 115.41 | 0.86646% |
| 165 | Normal Win | $2.40 | 1,111.11 | 0.0900% |
| 166 | Normal Win | $2.30 | 1,095.89 | 0.09125% |
| 167 | Normal Win | $2.20 | 416.67 | 0.2400% |
| 168 | Normal Win | $2.10 | 397.02 | 0.25188% |
| 169 | Normal Win | $2.00 | 121.27 | 0.82458% |
| 170 | Normal Win | $1.90 | 196.08 | 0.5100% |
| 171 | Normal Win | $1.80 | 39.28 | 2.54563% |
| 172 | Normal Win | $1.70 | 1,568.63 | 0.06375% |
| 173 | Normal Win | $1.60 | 1,246.75 | 0.08021% |
| 174 | Normal Win | $1.50 | 1,304.35 | 0.07667% |
| 175 | Normal Win | $1.40 | 610.69 | 0.16375% |
| 176 | Normal Win | $1.30 | 615.38 | 0.1625% |
| 177 | Normal Win | $1.20 | 305.54 | 0.32729% |
| 178 | Normal Win | $1.10 | 322.80 | 0.30979% |
| 179 | Normal Win | $1.00 | 178.44 | 0.56042% |
| 180 | Normal Win | $0.90 | 271.03 | 0.36896% |
| 181 | Normal Win | $0.80 | 144.32 | 0.69292% |
| 182 | Normal Win | $0.70 | 117.30 | 0.8525% |
| 183 | Normal Win | $0.60 | 46.75 | 2.13917% |
| 184 | Normal Win | $0.50 | 39.99 | 2.50083% |
| 185 | Normal Win | $0.40 | 15.64 | 6.39563% |
| 186 | Normal Win | $0.30 | 28.76 | 3.4775% |
| 187 | Normal Win | $0.20 | 9.89 | 10.1150% |
| 188 | Normal Win | $0.10 | 4.81 | 20.80417% |

(56) References Cited

U.S. PATENT DOCUMENTS

| | | | |
|---|---|---|---|
| 8,052,148 | B1 | 11/2011 | Kelly et al. |
| 8,216,045 | B2 | 7/2012 | Wright et al. |
| 8,308,551 | B2 | 11/2012 | Bennett, III et al. |
| 8,348,754 | B2 | 1/2013 | Jackson et al. |
| 8,845,409 | B2 | 9/2014 | Kane et al. |
| 2003/0080507 | A1 | 5/2003 | Higginson |
| 2003/0125108 | A1 | 7/2003 | Groz |
| 2005/0164767 | A1 | 7/2005 | Wright |
| 2006/0287072 | A1 | 12/2006 | Walker et al. |
| 2007/0123340 | A1 | 5/2007 | Vancura |
| 2008/0015005 | A1 | 1/2008 | Yaldoo et al. |
| 2010/0093419 | A1 | 4/2010 | Wright et al. |
| 2010/0124967 | A1 | 5/2010 | Lutnick et al. |
| 2010/0144418 | A1 | 6/2010 | Luciano, Jr. et al. |
| 2013/0102372 | A1 | 4/2013 | Lutnick et al. |
| 2013/0172062 | A1 | 7/2013 | Amaitis et al. |
| 2013/0210510 | A1 | 8/2013 | Mahaffey et al. |
| 2014/0187303 | A1 | 7/2014 | Irwin, Jr. |

100 101 102 103 104 105 106

| Tier Level | Win Type | Win Amount | Winner Every | Probability |
|---|---|---|---|---|
| 1 | Jackpot Win | $600.00 | 240,000.00 | 0.00042% |
| 2 | Normal Win | $43.40 | 480,000.00 | 0.00021% |
| 3 | Normal Win | $32.30 | 480,000.00 | 0.00021% |
| 4 | Normal Win | $28.60 | 480,000.00 | 0.00021% |
| 5 | Normal Win | $26.00 | 480,000.00 | 0.00021% |
| ... | | | | |
| 140 | Normal Win | $4.90 | 10,000.00 | 0.0100% |
| 141 | Normal Win | $4.80 | 9,411.76 | 0.01063% |
| 142 | Normal Win | $4.70 | 8,727.27 | 0.01146% |
| 143 | Normal Win | $4.60 | 4,403.67 | 0.02271% |
| 144 | Normal Win | $4.50 | 2,727.27 | 0.03667% |
| 145 | Normal Win | $4.40 | 3,018.87 | 0.03313% |
| 146 | Normal Win | $4.30 | 3,057.32 | 0.03271% |
| 147 | Normal Win | $4.20 | 3,157.89 | 0.03167% |
| 148 | Normal Win | $4.10 | 1,578.95 | 0.06333% |
| 149 | Normal Win | $4.00 | 581.82 | 0.17188% |
| 150 | Normal Win | $3.90 | 17,777.78 | 0.00563% |
| 151 | Normal Win | $3.80 | 12,307.69 | 0.00813% |
| 152 | Normal Win | $3.70 | 10,909.09 | 0.00917% |
| 153 | Normal Win | $3.60 | 6,956.52 | 0.01438% |
| 154 | Normal Win | $3.50 | 6,486.49 | 0.01542% |
| 155 | Normal Win | $3.40 | 6,666.67 | 0.0150% |
| 156 | Normal Win | $3.30 | 4,615.38 | 0.02167% |
| 157 | Normal Win | $3.20 | 4,000.00 | 0.0250% |
| 158 | Normal Win | $3.10 | 2,171.95 | 0.04604% |
| 159 | Normal Win | $3.00 | 1,853.28 | 0.05396% |
| 160 | Normal Win | $2.90 | 1,050.33 | 0.09521% |
| 161 | Normal Win | $2.80 | 1,441.44 | 0.06938% |
| 162 | Normal Win | $2.70 | 681.82 | 0.14667% |
| 163 | Normal Win | $2.60 | 445.27 | 0.22458% |
| 164 | Normal Win | $2.50 | 115.41 | 0.86646% |
| 165 | Normal Win | $2.40 | 1,111.11 | 0.0900% |
| 166 | Normal Win | $2.30 | 1,095.89 | 0.09125% |
| 167 | Normal Win | $2.20 | 416.67 | 0.2400% |
| 168 | Normal Win | $2.10 | 397.02 | 0.25188% |
| 169 | Normal Win | $2.00 | 121.27 | 0.82458% |
| 170 | Normal Win | $1.90 | 196.08 | 0.5100% |
| 171 | Normal Win | $1.80 | 39.28 | 2.54563% |
| 172 | Normal Win | $1.70 | 1,568.63 | 0.06375% |
| 173 | Normal Win | $1.60 | 1,246.75 | 0.08021% |
| 174 | Normal Win | $1.50 | 1,304.35 | 0.07667% |
| 175 | Normal Win | $1.40 | 610.69 | 0.16375% |
| 176 | Normal Win | $1.30 | 615.38 | 0.1625% |
| 177 | Normal Win | $1.20 | 305.54 | 0.32729% |
| 178 | Normal Win | $1.10 | 322.80 | 0.30979% |
| 179 | Normal Win | $1.00 | 178.44 | 0.56042% |
| 180 | Normal Win | $0.90 | 271.03 | 0.36896% |
| 181 | Normal Win | $0.80 | 144.32 | 0.69292% |
| 182 | Normal Win | $0.70 | 117.30 | 0.8525% |
| 183 | Normal Win | $0.60 | 46.75 | 2.13917% |
| 184 | Normal Win | $0.50 | 39.99 | 2.50083% |
| 185 | Normal Win | $0.40 | 15.64 | 6.39563% |
| 186 | Normal Win | $0.30 | 28.76 | 3.4775% |
| 187 | Normal Win | $0.20 | 9.89 | 10.1150% |
| 188 | Normal Win | $0.10 | 4.81 | 20.80417% |

FIG. 1

100

| Tier Level (101) | Win Type (102) | Win Amount (103) | Winner Every (104) | Probability (105) |
|---|---|---|---|---|
| 1 | Jackpot Win | $600.00 | 240,000.00 | 0.00042% |
| 2 | Normal Win | $43.40 | 480,000.00 | 0.00021% |
| 3 | Normal Win | $32.30 | 480,000.00 | 0.00021% |
| 4 | Normal Win | $28.60 | 480,000.00 | 0.00021% |
| 5 | Normal Win | $26.00 | 480,000.00 | 0.00021% |
| ... | | | | |
| 140 | Normal Win | $4.90 | 10,000.00 | 0.0100% |
| 141 | Normal Win | $4.80 | 9,411.76 | 0.01063% |
| 142 | Normal Win | $4.70 | 8,727.27 | 0.01146% |
| 143 | Normal Win | $4.60 | 4,403.67 | 0.02271% |
| 144 | Normal Win | $4.50 | 2,727.27 | 0.03667% |
| 145 | Normal Win | $4.40 | 3,018.87 | 0.03313% |
| 146 | Normal Win | $4.30 | 3,057.32 | 0.03271% |
| 147 | Normal Win | $4.20 | 3,157.89 | 0.03167% |
| 148 | Normal Win | $4.10 | 1,578.95 | 0.06333% |
| 149 | Normal Win | $4.00 | 581.82 | 0.17188% |
| 150 | Normal Win | $3.90 | 17,777.78 | 0.00563% |
| 151 | Normal Win | $3.80 | 12,307.69 | 0.00813% |
| 152 | Normal Win | $3.70 | 10,909.09 | 0.00917% |
| 153 | Normal Win | $3.60 | 6,956.52 | 0.01438% |
| 154 | Normal Win | $3.50 | 6,486.49 | 0.01542% |
| 155 | Normal Win | $3.40 | 6,666.67 | 0.0150% |
| 156 | Normal Win | $3.30 | 4,615.38 | 0.02167% |
| 157 | Normal Win | $3.20 | 4,000.00 | 0.0250% |
| 158 | Normal Win | $3.10 | 2,171.95 | 0.04604% |
| 159 | Normal Win | $3.00 | 1,853.28 | 0.05396% |
| 160 | Normal Win | $2.90 | 1,050.33 | 0.09521% |
| 161 | Normal Win | $2.80 | 1,441.44 | 0.06938% |
| 162 | Normal Win | $2.70 | 681.82 | 0.14667% |
| 163 | Normal Win | $2.60 | 445.27 | 0.22458% |
| 164 | Normal Win | $2.50 | 115.41 | 0.86646% |
| 165 | Normal Win | $2.40 | 1,111.11 | 0.0900% |
| 166 | Normal Win | $2.30 | 1,095.89 | 0.09125% |
| 167 | Normal Win | $2.20 | 416.67 | 0.2400% |
| 168 | Normal Win | $2.10 | 397.02 | 0.25188% |
| 169 | Normal Win | $2.00 | 121.27 | 0.82458% |
| 170 | Normal Win | $1.90 | 196.08 | 0.5100% |
| 171 | Normal Win | $1.80 | 39.28 | 2.54563% |
| 172 | Normal Win | $1.70 | 1,568.63 | 0.06375% |
| 173 | Normal Win | $1.60 | 1,246.75 | 0.08021% |
| 174 | Normal Win | $1.50 | 1,304.35 | 0.07667% |
| 175 | Normal Win | $1.40 | 610.69 | 0.16375% |
| 176 | Normal Win | $1.30 | 615.38 | 0.1625% |
| 177 | Normal Win | $1.20 | 305.54 | 0.32729% |
| 178 | Normal Win | $1.10 | 322.80 | 0.30979% |
| 179 | Normal Win | $1.00 | 178.44 | 0.56042% |
| 180 | Normal Win | $0.90 | 271.03 | 0.36896% |
| 181 | Normal Win | $0.80 | 144.32 | 0.69292% |
| 182 | Normal Win | $0.70 | 117.30 | 0.8525% |
| 183 | Normal Win | $0.60 | 46.75 | 2.13917% |
| 184 | Normal Win | $0.50 | 39.99 | 2.50083% |
| 185 | Normal Win | $0.40 | 15.64 | 6.39563% |
| 186 | Normal Win | $0.30 | 28.76 | 3.4775% |
| 187 | Normal Win | $0.20 | 9.89 | 10.1150% |
| 188 | Normal Win | $0.10 | 4.81 | 20.80417% |

106

| | Prize | Probability | |
|---|---|---|---|
| 150 | $ 100,000 | 0.0004 | 160 |
| 151 | $ 25,000 | 0.002 | 161 |
| 152 | $ 10,000 | 0.010 | 162 |
| 153 | $ 1,000 | 0.040 | 163 |
| 154 | $ 500 | 0.070 | 164 |
| 155 | $ 250 | 0.878 | 165 |

125

FIG. 2A 100 101 102 103 104 105 106'

| Tier Level | Win Type | Win Amount | Winner Every | Probability |
|---|---|---|---|---|
| 1 | Jackpot Win | $600.00 | 240,000.00 | 0.00042% |
| 2 | Normal Win | $43.40 | 480,000.00 | 0.00021% |
| 3 | Normal Win | $32.30 | 480,000.00 | 0.00021% |
| 4 | Normal Win | $28.60 | 480,000.00 | 0.00021% |
| 5 | Normal Win | $26.00 | 480,000.00 | 0.00021% |
| ... | | | | |
| 140 | Normal Win | $4.90 | 10,000.00 | 0.0100% |
| 141 | Normal Win | $4.80 | 9,411.76 | 0.01063% |
| 142 | Normal Win | $4.70 | 8,727.27 | 0.01146% |
| 143 | Normal Win | $4.60 | 4,403.67 | 0.02271% |
| 144 | Normal Win | $4.50 | 2,727.27 | 0.03667% |
| 145 | Normal Win | $4.40 | 3,018.87 | 0.03313% |
| 146 | Normal Win | $4.30 | 3,057.32 | 0.03271% |
| 147 | Normal Win | $4.20 | 3,157.89 | 0.03167% |
| 148 | Normal Win | $4.10 | 1,578.95 | 0.06333% |
| 149 | Normal Win | $4.00 | 581.82 | 0.17188% |
| 150 | Normal Win | $3.90 | 17,777.78 | 0.00563% |
| 151 | Normal Win | $3.80 | 12,307.69 | 0.00813% |
| 152 | Normal Win | $3.70 | 10,909.09 | 0.00917% |
| 153 | Normal Win | $3.60 | 6,956.52 | 0.01438% |
| 154 | Normal Win | $3.50 | 6,486.49 | 0.01542% |
| 155 | Normal Win | $3.40 | 6,666.67 | 0.0150% |
| 156 | Normal Win | $3.30 | 4,615.38 | 0.02167% |
| 157 | Normal Win | $3.20 | 4,000.00 | 0.0250% |
| 158 | Normal Win | $3.10 | 2,171.95 | 0.04604% |
| 159 | Normal Win | $3.00 | 1,853.28 | 0.05396% |
| 160 | Normal Win | $2.90 | 1,050.33 | 0.09521% |
| 161 | Normal Win | $2.80 | 1,441.44 | 0.06938% |
| 162 | Normal Win | $2.70 | 681.82 | 0.14667% |
| 163 | Normal Win | $2.60 | 445.27 | 0.22458% |
| 164 | Normal Win | $2.50 | 115.41 | 0.86646% |
| 165 | Normal Win | $2.40 | 1,111.11 | 0.0900% |
| 166 | Normal Win | $2.30 | 1,095.89 | 0.09125% |
| 167 | Normal Win | $2.20 | 416.67 | 0.2400% |
| 168 | Normal Win | $2.10 | 397.02 | 0.25188% |
| 169 | Normal Win | $2.00 | 121.27 | 0.82458% |
| 170 | Normal Win | $1.90 | 196.08 | 0.5100% |
| 171 | Normal Win | $1.80 | 39.28 | 2.54563% |
| 172 | Normal Win | $1.70 | 1,568.63 | 0.06375% |
| 173 | Normal Win | $1.60 | 1,246.75 | 0.08021% |
| 174 | Normal Win | $1.50 | 1,304.35 | 0.07667% |
| 175 | Normal Win | $1.40 | 610.69 | 0.16375% |
| 176 | Normal Win | $1.30 | 615.38 | 0.1625% |
| 177 | Normal Win | $1.20 | 305.54 | 0.32729% |
| 178 | Normal Win | $1.10 | 322.80 | 0.30979% |
| 179 | Normal Win | $1.00 | 178.44 | 0.56042% |
| 180 | Normal Win | $0.90 | 271.03 | 0.36896% |
| 181 | Normal Win | $0.80 | 144.32 | 0.69292% |
| 182 | Normal Win | $0.70 | 117.30 | 0.8525% |
| 183 | Normal Win | $0.60 | 46.75 | 2.13917% |
| 184 | Normal Win | $0.50 | 39.99 | 2.50083% |
| 185 | Normal Win | $0.40 | 15.64 | 6.39563% |
| 186 | Normal Win | $0.30 | 28.76 | 3.4775% |
| 187 | Normal Win | $0.20 | 9.89 | 10.1150% |
| 188 | Normal Win | $0.10 | 4.81 | 20.80417% |

150' 151' 125' 160' 161'

| Prize | Probability |
|---|---|
| $ 1.100 | 0.47 |
| $ 100 | 0.530 |

FIG. 2B

SYSTEM AND METHOD FOR USING CONDITIONAL PROBABILITIES TO ENHANCE GAMING PAYOUTS

CROSS-REFERENCE TO RELATED APPLICATIONS

The present application claims priority to U.S. Provisional Application No. 62/240,301, filed on Oct. 12, 2015, which is hereby incorporated by reference.

BACKGROUND OF THE INVENTION

1. Field of the Invention

The present invention is directed to the innovation of control mechanisms for enabling Instant Ticket Vending Machines (ITVMs), or instant tickets to offer conditional probability prizes of a higher value than are typically available for fixed or parimutuel games of chance. Specifically, this innovation resolves the problem of offering larger prizes on common games with a relatively small sales base. The common games are preferably implemented on ITVMs.

2. Background

"Class II" ITVMs enable games of chance to be played with enhanced entertainment and appeal resulting in millions of dollars in revenue worldwide. ITVMs rely on instant ticket's or pull-tab's prize awards dispensed at the time of play and generate profit by essentially allocating a portion of play revenue for prizes with the remainder allocated to expenses and yield.

Over the years companies have come to appreciate the virtues of producing games with more entertainment value of higher prizes that can be sold at a premium price. However, in the special case of ITVMs, these premium games are still limited to payout percentages established by law that are typically 65% for instant games. Thus, while higher prices can support higher prizes, the overall payout percentage remains the same, which can limit a game's appeal to a broader audience compared to other gaming venues that have much higher payout percentages.

In attempts to enhance player interest and participation in ITVMs, gaming manufacturers have added numerous kinds of additional game play to the primary game. One type of additional game play provides extra or bonus winnings from "progressive bonuses" or simply "progressives." Progressive machines are designed to overcome the small payout associated with the bonus or secondary games discussed above. Progressive bonus play differs from other types of prior art bonus play in that multiple machines contribute to a common pool, winnable by a player of an individual machine upon the occurrence of specified randomized events. Progressives are funded by taking a fixed portion (percentage) of each wager made by players at individual machines, where the fixed portion of the wagers are collected into a single pool or pot to be won by a single player. Because a large number of machines are contributing to this common pool (amount of money collected), it is significantly larger than that available on a single machine. It is the larger pools that create the additional player interest and excitement.

However, progressive jackpot machines are most effective in large networks where the progressive jackpot can grow quickly and become a substantial amount to entice "Punter" and "Jackpot" players. In small networks or isolated gaming machines, progressive jackpots tend to not be appealing to these types of players and consequently tend to not increase sales. Additionally, in the case of a progressive jackpot operating in a large network, there is a corresponding smaller amount of likelihood an individual will be the winner of the larger pool.

Thus, there is a need to increase player interest and participation in ITVMs through the use of incentives that pay larger amounts than bonus game play, but are perceived by the players as having a higher likelihood of winning as compared to the large, but very infrequently won, progressive and draw game tickets.

SUMMARY OF THE INVENTION

Objects and advantages of the present invention will be set forth in part in the following description, or may be obvious from the description, or may be learned through practice of the invention.

Described are mechanisms, systems, and methodologies related to conditional probability prize fund accelerators enabling hitherto unknown methods of expanding the consumer perceived prize fund in ITVMs that do not necessitate increasing the basic prize fund beyond its existing standard or legal maximum.

In a particular embodiment, conditional probabilities are linked to specific levels of a common fixed prize fund where the prize payout is within predefined limits, yet offering chances at larger prizes (e.g., $1,200; $5,000; $100,000) on games over a predefined number of plays or "buy-ins." This conditional probability enabler feature is implemented at the time of the prize fund generation. This embodiment is particularly desirable for "Class II" ITVM instant tickets or pull-tabs where all prize awards are determined during the instant ticket or pull-tab printing process. In an alternative embodiment, the conditional probabilities can be added to a fixed prize fund where when a fixed prize fund enhanced conditional probability prize tier is selected at a later time, the actual conditional probability drawing occurs at this time using its own prize table via some form of Random Number Generator (RNG).

In another embodiment, conditional probabilities are linked to specific levels of a dynamic prize fund where the prize payout is within prescribed limits of risk while still offering chances at large prizes on games with a relatively small number of plays or buy-ins. This embodiment differs from the previous embodiments in that the conditional probabilities are linked to specific levels associated with dynamic prize funds. Dynamic prize funds differ from static prize funds in that dynamic prize fund systems typically employ a random or pseudorandom event (e.g., RNG, player selection) to select a standard (one dimensional) prize level in approximately real time (e.g., when the consumer "pulls" the play on a "Class II" machine). The (second or other dimension) conditional probability function is applied when a given prize tier is selected near real time. In contrast, with static prize funds, prize tiers are essentially awarded when the instant tickets are generated and printed.

In yet another embodiment, conditional probabilities are linked to specific levels of a static or dynamic prize fund where the conditional probabilities itself is dynamic or fluid depending on the total plays or buy-ins at any given moment in time. In this embodiment, the static or dynamic prize fund and associated payouts are maintained within prescribed limits of risk with the aid of real world feedback.

A number of mechanisms and methodologies that provide practical details for reliably producing conditional probability enhanced prize funds and associated secondary games are described below. Although the examples provided herein are primarily related to ITVMs, it is clear that the same methods are applicable to any type of small number specialized games with a common prize fund.

BRIEF DESCRIPTION OF THE DRAWINGS

FIG. 1 is a first representative example of a standard prize structure for a typical prior art ITVM instant or pull-tab game;

FIG. 2A is a representative example of the ITVM instant ticket or pull-tab game prize structure of FIG. 1 with a conditional probability enhancement applied to one prize level, in accordance with a preferred embodiment of the present invention wherein a significantly higher top prize is enabled by the conditional probability enhancement;

FIG. 2B is a representative example of the ITVM instant ticket or pull-tab game prize structure of FIG. 1 with a conditional probability enhancement applied to one prize level, in accordance with an alternative embodiment of the present invention wherein a marginally higher top prize is enabled by the conditional probability enhancement;

DETAILED DESCRIPTION OF THE INVENTION

Figure 3:
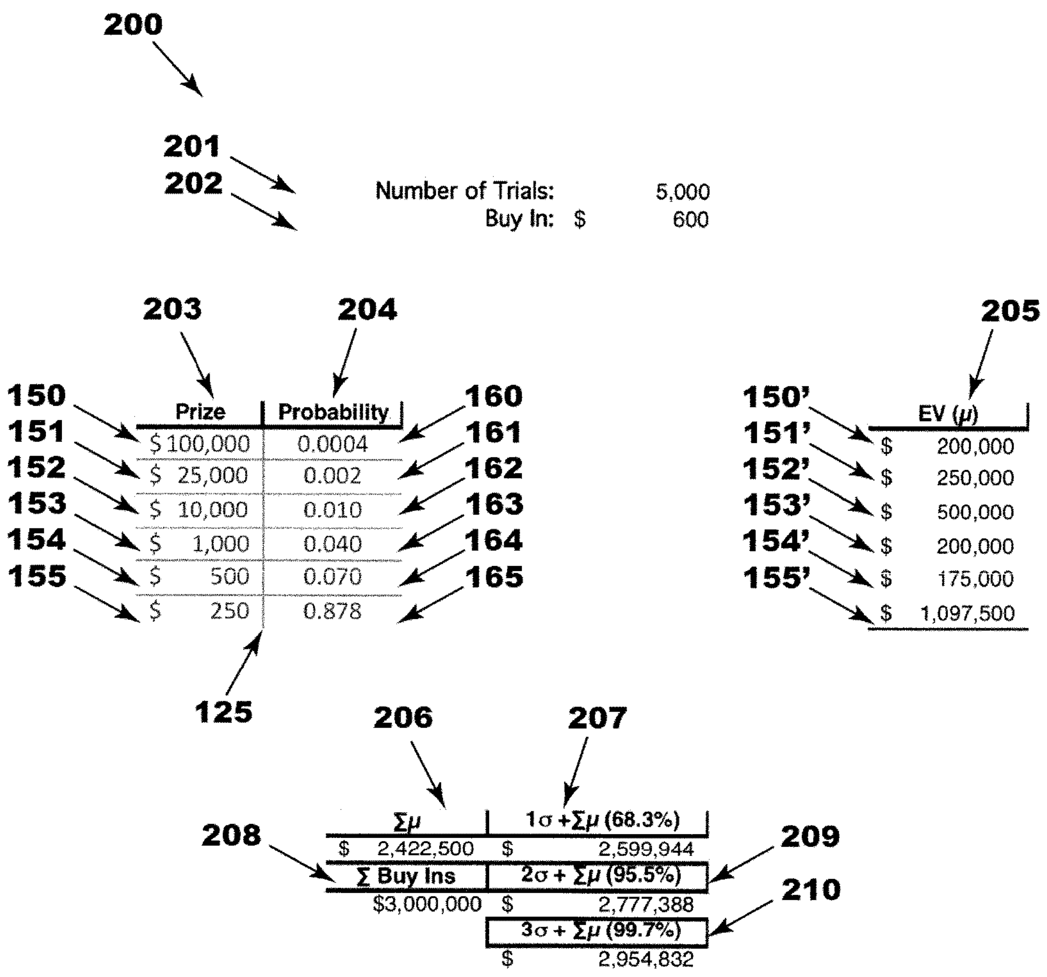
FIG. 3 is a breakdown of the six conditional probability enhanced prize sub-levels of FIG. 2A highlighting each sub-level: probability, Expected Value (EV), 3σ (3 Sigma), total buy-ins, and number of trials.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

FIG. 1 depicts a typical prior art prize structure 100 for a "Class II" ITVM instant or pull-tab game. As shown in FIG. 1, this typical example features multiplicities of possible winning tiers arranged by tier level 101 with the highest jackpot winner 106 assigned tier level "1". Also listed in the prize structure are the types of wins 102, the amount won 103, the frequency of winning 104, and the associated probability 105. Thus, in a typical prize structure there are multiplicities of winning tiers with fixed denominations assigned to each tier. This assignment of fixed prizes enables the total payout to be known, assuming the game sells out.

Providing a conditional probability enhancement to either a static or dynamic prize fund requires determination of: (i) a buy-in amount for each enhanced prize sub-level, (ii) at least a first order approximation of the anticipated number of trials, and (iii) a proper set of enhanced prize sub-levels that is both exhaustive and mutually-exclusive (i.e., the set of enhanced prize sub-levels must include all possibilities and each event in the set must be so defined that its occurrence excludes the occurrence of any other in the set). By applying these inputs to a conditional probability enhancement algorithm, an enhanced conditional probability prize structure can be realized, thereby providing higher potential prizes without significant risk to the expected profit of the game.

In statistics, the standard deviation (typically abbreviated by the Greek letter sigma, σ) for a population is a measure that is used to quantify the amount of variation or dispersion of a set of data values. A standard deviation close to zero indicates that the data points tend to be very close to the mean (typically abbreviated by the Greek letter mu, μ) of the set, while a high standard deviation indicates that the data points are spread out over a wider range of values. For the normal (Gaussian) distribution, the values less than one standard deviation (σ) away from the mean (μ) account for 68.27% of the set; while two standard deviations (2σ) from the mean (μ) account for 95.45%; and three standard deviations (3σ) account for 99.73%. In the context of this invention, the mean (μ) is the average jackpot prize or the Expected Value (EV). The mean (μ) average jackpot prize or EV is the probability-weighted average of all possible values. In other words, each possible value the outcome can assume is multiplied by its probability of occurring, and the resulting products are summed to produce the mean (μ) average jackpot prize or EV.

In one embodiment, the conditional probability enhancement algorithm accepts the previously described inputs, calculates the mean (μ) average jackpot prize or EV for the overall conditional probability enhancement, the sum of the total buy-ins (Σ Buy-Ins) anticipated for a game, the sum total of the individual sub-prize levels EV (Σμ), as well as 3σ for the conditional probability enhancement. Thus, so long as sum of 3σ and Σμ (i.e., 3σ+Σμ) is less than Σ Buy-Ins there is at least a 99.73% probability that the conditional probability enhancement payouts will not exceed the budgeted prize fund for a given game. Due to the biasing of conditional probability enhanced prize sub-levels, the redeemed prize curve is not truly Gaussian, hence some deviation from the ideal is to be expected. However, due to the inherent nature of the enhanced prize sub-levels quantization, the deviation should always take the conservative form of less money fluctuation from μ. Additionally, while the 3σ value reflects the expected fluctuation plus or minus from μ, as a practical manner the game operator is only concerned with the asymmetry of exceeding the plus side and not the minus. But, nevertheless the 3σ+Σμ value provides an excellent (worst case) approximation assuming 99.7% of the expected cases.

For example, FIG. 2A illustrates the standard prize structure 100 of FIG. 1 with an enhanced conditional probability utilizing the normal "Jackpot Win" 106 value of $600 as a buy-in to a second (conditional) probability drawing 125 with six different sub-tier prizes (150 through 155) ranging from a low of $250 to a high of $100,000 (155 and 150 respectively). Thus, in this example, every time a player wins a "Jackpot" 106 in the standard game 100, the ITVM effectively conducts a second conditional probability drawing where the outcome ranges from $250 to $100,000, thereby allowing the game to advertise a top prize of $100,000. The general concept is that there is very little human incentive difference between winning $600 (the standard "Jackpot Win" 106 value) and $250 (the minimum conditional probability prize 155); however, there is a significant difference in human perception between winning $600 and $100,000 (the maximum conditional probability prize 150). Thus, the "Punter" (i.e., players that like high volatility or a high standard deviation—three or more—from the EV) and "Jackpot" (i.e., players that like a potential payout of 10,000:1 or greater) players may find this particular enhanced game more appealing.

This is not to imply that a secondary conditional probability drawing must offer significantly enhanced top prizes whenever a player wins a "Jackpot" 106 in the standard game 100. It is also possible, and in some embodiments desirable, for the secondary conditional probability drawing to only offer marginally higher top prizes—e.g., see FIG. 2B. In the example of FIG. 2B, the standard prize structure 100 of FIG. 1 includes an enhanced conditional probability utilizing the normal "Jackpot Win" 106' value of $600 as a buy-in to a second (conditional) probability drawing 125' with just two different sub-tier prizes of $100 and $1,100 (150' and 151'). Thus, in this example, every time a player wins a "Jackpot" 106 in the standard game 100, the ITVM effectively conducts a second conditional probability drawing where the outcome is either $100 to $1,100, thereby increasing the probability of an enhanced prize occurring to virtually 50%/50%. This secondary conditional probability drawing is designed to appeal to "Grind" players (i.e., players that favor low volatility or a low standard deviation one or less—from the EV). Therefore, different enhanced conditional probability drawings can be designed to appeal to different types of players thereby increasing a game's appeal to specifically targeted demographics. In another alternative embodiment, the player may be allowed to select which enhanced conditional probability drawing he or she desires before they know the outcome.

Consequently, in the above-described embodiments, by adding a conditional probability drawing 125, the standard "Jackpot Win" is enhanced to offer higher top prizes comprised of a variable number of sub-tiers (six 150-155 in FIG. 2A), each with their associated probability (160 thru 165). The odds of winning higher prizes in the enhanced drawing are therefore reduced since the drawing is a conditional probability (i.e., the enhanced conditional probability drawing only occurs if the player first wins the "$600" jackpot buy-in). In the example of probability drawing 125, the enhanced conditional probability drawing offers a 0.0004% 160 (i.e., one in 2,500 chance) of winning $100,000. The play mechanics of informing the player of the enhanced conditional probability drawing 125 can be to simply display the enhanced conditional probability drawing 125 outcome when the "Jackpot Win" occurs or to enter into a secondary game (e.g., spinning wheel, virtual dice roll). Additionally, since the standard "Jackpot Win" is "$600" and the buy-in for the enhanced conditional probability drawing 125 is "$600." the play mechanics may even be designed to give the player the choice of opting for the enhanced conditional probability drawing 125 or not. Either choice will not impact the overall prize fund or profit assuming a sufficient number of enhanced conditional probability drawings 125 were conducted. In an alternative embodiment, the ITVMs track the percentage of choices where the player has opted to not play the enhanced conditional probability drawing 125 in the event of a "Jackpot Win" and eliminates that choice from the user interface if the number of opting out selections exceed a certain threshold.

FIG. 3 is a breakdown 200 of the enhanced conditional probability drawing 125 having six conditional probability enhanced prize sub-levels 203 of FIG. 2A highlighting each sub-level's: prize (150 thru 155), probability (160 thru 165), and EV or $\mu$ (150' thru 155'). Overall Number of Trials (201), Buy-Ins (202), $\Sigma\mu$ (206), $\Sigma$ Buy-Ins (208), and $2\sigma+\Sigma\mu$ thru $3\sigma+\Sigma\mu$ (209, and 210) values are also illustrated in FIG. 3. As shown in FIG. 3, the $3\sigma+\Sigma\mu$ value is $2,954,832, which is obviously less than the $\Sigma$ Buy-Ins (208) value of $3,000,000. Thus, for this particular arrangement of conditional probability enhanced prize sub-levels 203 with their associated probabilities 204, there is a likelihood (i.e., >99.7%) that given a Buy-In 202 of $600 per conditional probability over 5,000 trials 201, the normal prize fund is capable of financing the conditional probability enhancements with a reasonable expectation that additional funds will be garnered. Conversely, if all of the previous input parameters remain the same with only the Number of Trials changed to 500 (not shown in FIG. 3), the risk of the conditional probability enhanced prize sub-levels dramatically changes with the $3\sigma+\Sigma\mu$ value changing to $410,588 with the $\Sigma$ Buy-Ins value becoming $300,000. Therefore, in this revised example with only 500 trials, the risks of the conditional probability enhancements are no longer acceptable.

Figure 4:
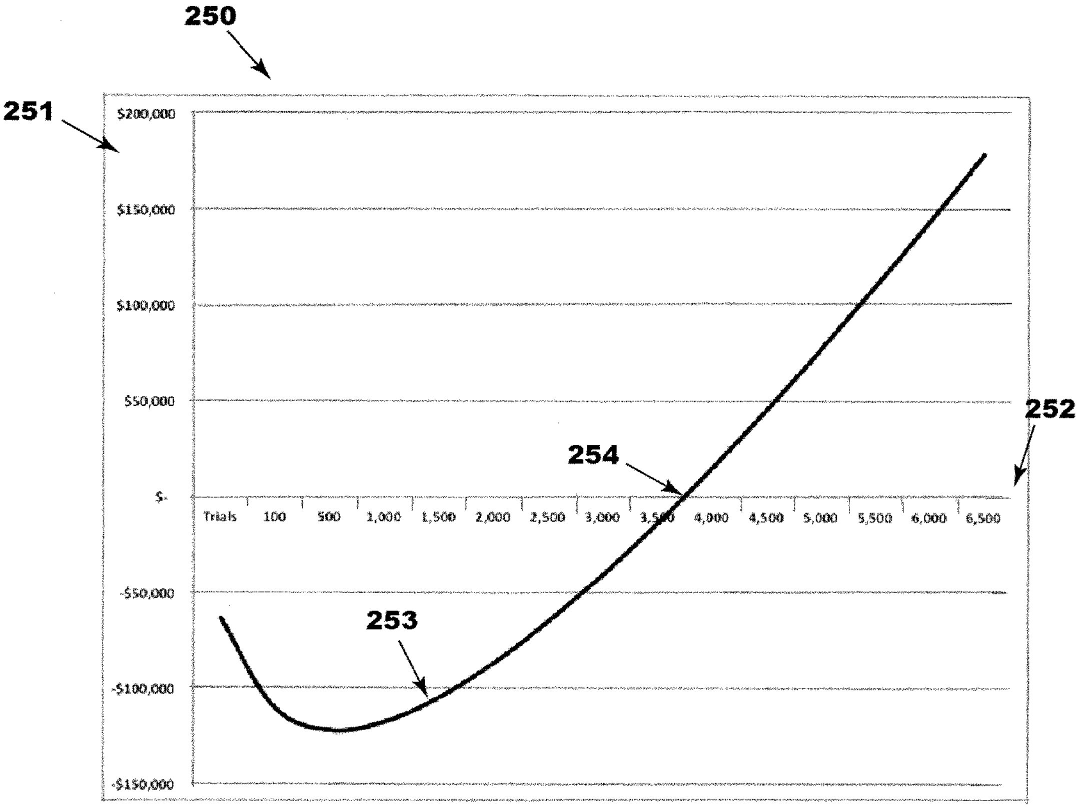
FIG. 4 is a graph of the six conditional probability enhanced prize sub-levels of FIG. 2A combined into one curve illustrating the impact of the number of trials verses risk.

FIG. 4 illustrates the six conditional probability enhanced prize sub-levels 203 of FIG. 2A graphed 250 with the same input parameters of FIG. 3 except for the Number of Trials varying from zero to 6,500 on the abscissa 252 (FIG. 4). As shown in graph 200, the ordinate's 251 scale ranges from a negative −$150,000 to a maximum of $200,000. The plotted line 253 in the graph 200 represents the delta or difference between the $\Sigma$ Buy-Ins values and the $3\sigma+\Sigma\mu$ values changing with respect to the Number of Trials with the plotted delta line 253 crossing the abscissa 252 around 3,500 trials. Thus, for the six conditional probability enhanced prize sub-levels (150 thru 155) and their associated probabilities (162 thru 165) of FIG. 2A, the enhanced prize sub-level structure becomes an acceptable risk around 3,500 trials (labeled as 254 in FIG. 4) assuming the $3\sigma+\Sigma\mu$ model.

There are other methodologies for calculating risk associated with conditional probability enhanced prize funds (e.g., confidence intervals, Monte Carlo methods, $2\sigma+\Sigma\mu$) that may under some circumstances be more desirable. The disclosed $3\sigma+\Sigma\mu$ model is merely one possible example of this embodiment with other methodologies possible. Again, the significant concept is to charge the standard prize fund a fee for at least one prize level with conditional probability enhancements being associated to that prize level at an acceptable risk level. Thus, with conditional probability enhancements, the perceived prize fund is enhanced (i.e., higher top prizes) without impacting the prize fund's overall EV over a minimum specified number of trials.

In yet another embodiment, a majority of the jackpot tickets have a value that is slightly higher than the EV and the remaining jackpot tickets have a value that is significantly lower than the EV. The prize structure in this embodiment is adjusted accordingly based on the concepts disclosed above to create the prize structures of the other embodiments.

Figure 5A:
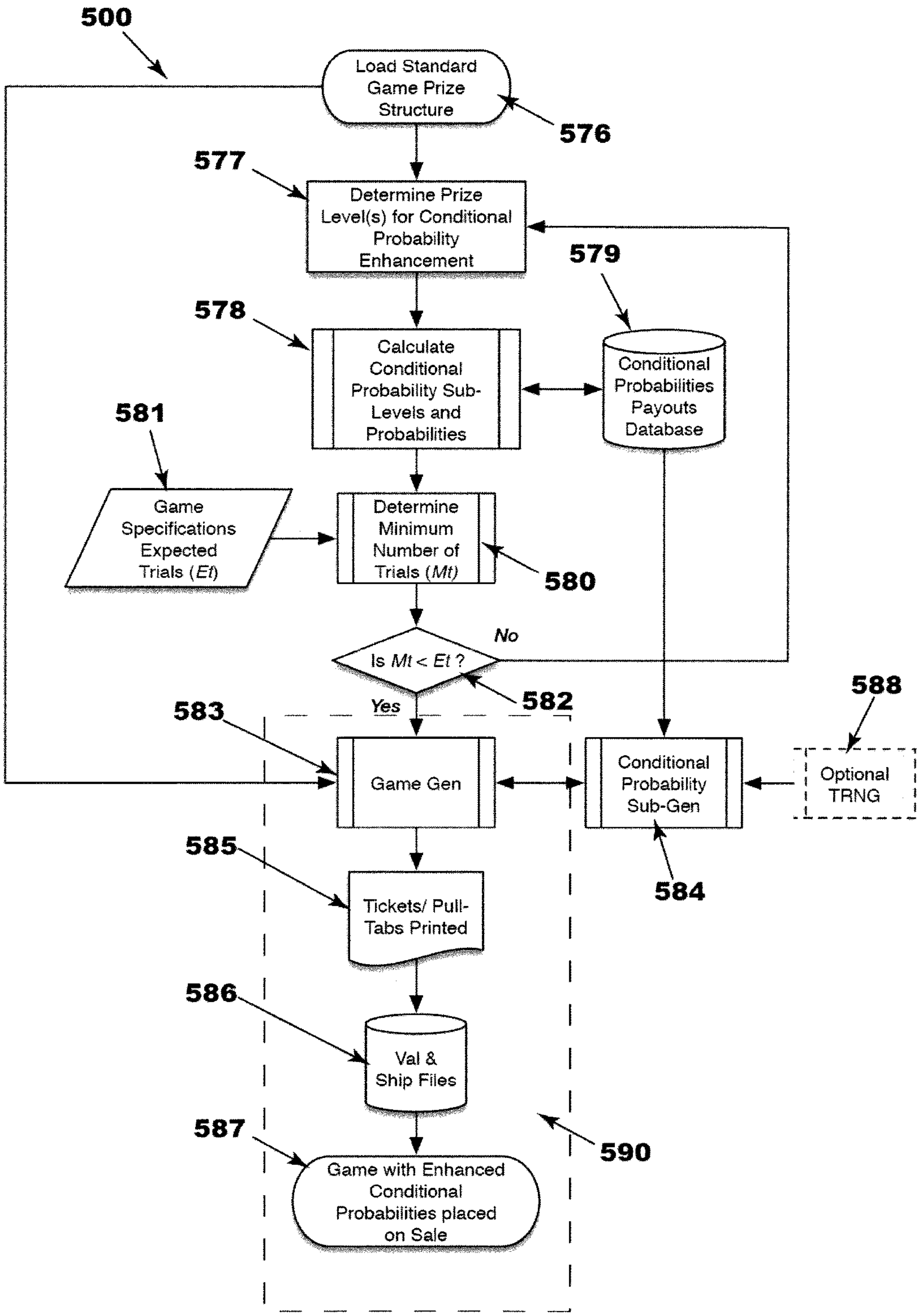
FIG. 5A is a flowchart of a representative example of a conditional probability enhancement generator applied to the static exemplary enhanced prize structure of FIG. 2A.
Figure 5B:
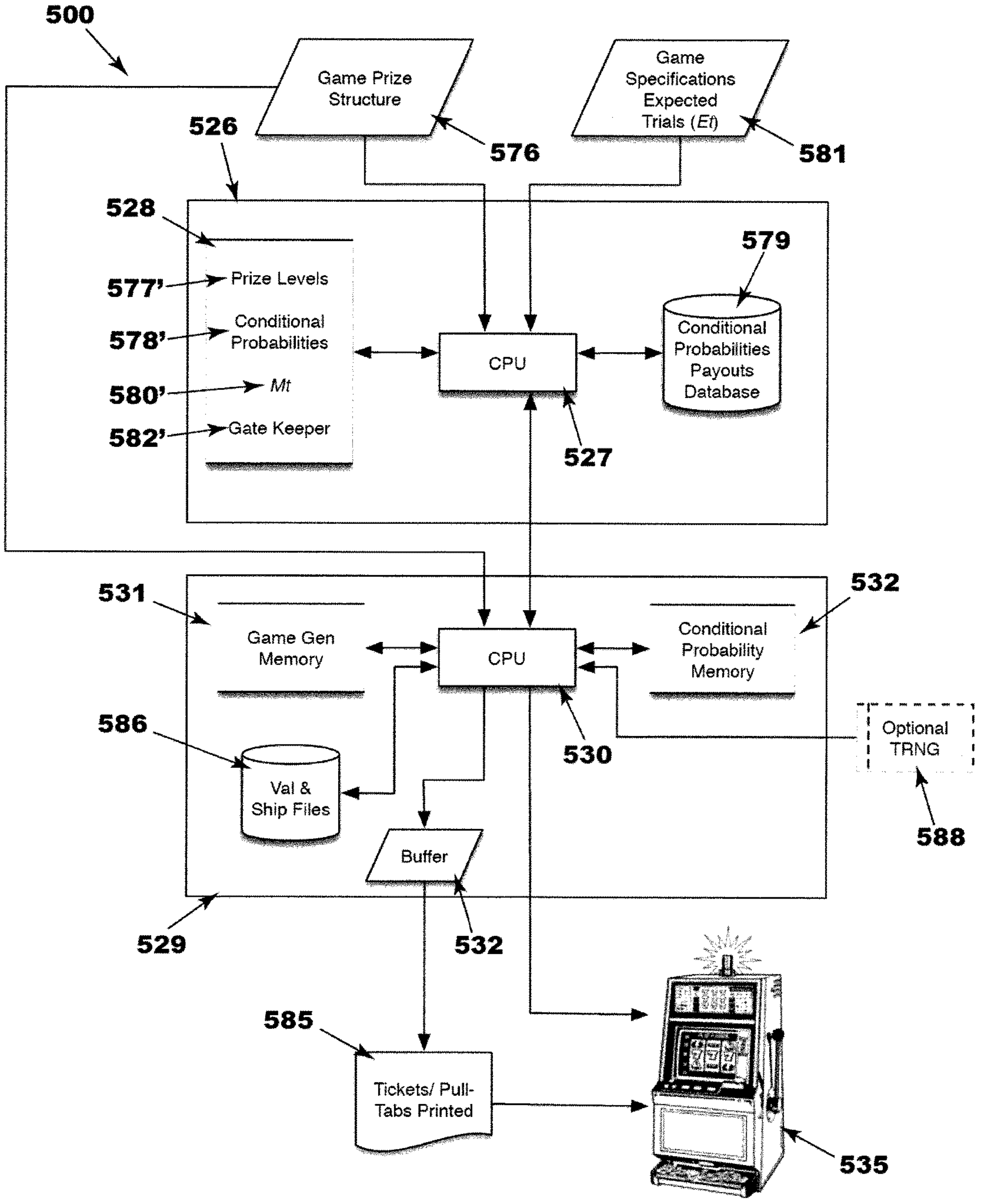
FIG. 5B is a system architecture diagram corresponding to FIG. 5A.

FIGS. 5A and 5B, taken together, illustrate one embodiment 500 of conditional probability enhancements, which are seamlessly integrated into the production of "Class II" ITVMs instant tickets or pull-tabs. To clearly differentiate the mechanism for integrating conditional probability enhancements into the standard (prior art) process for ITVM tickets, the standard process for producing tickets for ITVMs is highlighted in a dashed area 590 (FIG. 5A).

FIG. 5A is a flowchart of an embodiment 500 that begins with selecting a conventional game prize structure 576 for conditional probability enhancement and loading the game's prize structure data into the enhancement algorithmic generator 577 first component as well as the standard game generator 583. Once the prize level(s) for enhancement have been selected, the second component to the enhancement algorithmic generator 578 calculates the various sub-levels for each standard prize level selected for enhancement as well as the optimal conditional probabilities for each sub-level. The number of sub-levels assigned to an enhanced prize level, as well as the associated probabilities, can be in the form of human input or preferably algorithmically selected based on enhancement rules. With either human input or algorithmically determined sub-prize level probabilities, the algorithm will ensure that the sum total of all sub-level probability entries equals unity (i.e., "1") thereby ensuring the proper set is both exhaustive and mutually exclusive. Regardless of how the sub-level prizes and probabilities were determined, the resulting candidate conditional probabilities payouts are saved to a database 579.

The third component of the enhancement algorithmic generator 580 then algorithmically determines the Minimum number of Trials ($M_t$) necessary to provide the acceptable level of risk for providing an enhanced conditional probability payout at a given prize level. As previously stated, the actual methodology for determining the enhanced conditional probability acceptable risk can vary (e.g., confidence intervals, Monte Carlo methods, $2\sigma+\Sigma\mu$). However, in this preferred embodiment when the difference between the Buy-Ins value minus the $3\sigma+\Sigma\mu$ value turns positive with respect to the number of trials, this constitutes the lowest threshold of acceptable risk or "$M_t$" (e.g., 254 in FIG. 4). In addition to calculating $M_t$, the third component 580 (FIG. 5A) accepts the Expected number of Trials ($E_t$) as an additional input 581. $E_t$ is determined in this embodiment by the size of the ITVM ticket/pull-tab order or the size of combined ticket/pull-tab orders that share the same risk.

The fourth component of the enhancement algorithmic generator 582 functions as a risk assessment gatekeeper by simply testing to determine if $M_t$ is less than $E_t$. Once the fourth gatekeeping component is satisfied, the candidate conditional probabilities payouts are promoted to actual probabilities payouts and a flag is created for the prize level(s) to be enhanced and passed to the standard game generator 583.

The standard game generator 583 creates the image files for all of the tickets/pull-tabs to be printed for ITVMs. This basic process is not significantly different with the addition of enhanced prize levels. The only difference occurs when game generator 583 determines that a given pending ticket/pull-tab image is associated with a prize level to be enhanced. When this occurs, a call is made to the fifth component of the enhancement algorithmic generator 584 that accesses the actual probabilities payouts file 579 associated with the game and prize level being imaged and conducts its own drawing determining which sub-level prize will be associated with the ticket/pull-tab to be imaged. The drawing conducted by the conditional probability sub-generator 584 weighs each sub-prize level according to its probability assigned in the database. In a preferred embodiment, the conditional probability sub-generator 584 performs the drawing based on a, preferably, digitally signed seed or random number from an external device 588 such as a True Random Number Generator (TRNG). The optional external hardware TRNG provides a virtually infinite source of random numbers that can be, preferably, audited to verify that that the sub-prize level drawing was authentic.

Once all of the enhanced prizes have been determined 584 and the ticket/pull-tab image generation is completed 583, the tickets or pull-tabs are printed in the traditional manner 585, with any validation and ship files 586 also generated, and ultimately loaded into the ITVMs 587 in the field. The prize codes printed on the tickets or pull-tabs are expanded to include all of the possible sub-tier prizes from the actual probabilities payouts file 579. For security considerations well known in the art, at least one embodiment of the prize codes printed on the tickets or pull-tabs are typically printed in cryptographically secure machine readable variable indicia—preferably in an encrypted machine readable format using a symmetrical encryption algorithm such as the Advanced Encryption Algorithm (AES). Optionally, in addition to the machine readable cryptographically secure variable indicia, human readable (i.e., cleartext) indicia indicating the ticket's prize and/or jackpot status may also be added to the ticket or pull-tab. Typically, when human readable prize indicia are included, it is further secured by being hidden under a Scratch Off Coating (SOC).

As shown in the embodiment's 500 associated system architecture diagram FIG. 5B, the four components of the enhancement algorithmic generator ideally reside in a separate server 526 physically located in a different (i.e., less secure) area than the standard game generator server 529. This server physical isolation is preferred because multiplicities of personnel may need to access the enhancement algorithmic generator server 526 to update prize structures, $E_t$, conditional probability payout tables, and the like. However, for security reasons, these same personnel should not be granted access to any game's validation (i.e., win or lose) data. By housing the enhancement algorithmic generator in a server 526 physically separated from the higher security game generation server 529, differing logical and physical security can be readily accommodated for the two servers.

The enhancement algorithmic generator server 526 receives game prize structure data 576 from an outside source directly into its Central Processing Unit (CPU) 527. Additionally, the enhancement algorithmic generator server 526 CPU 527 receives $E_t$ 581 data. Aside from the CPU 527, the enhancement algorithmic generator server 526 also includes memory 528, as well as a database of conditional probability payouts 579. The memory 528 is sufficient to embody and run the enhancement algorithmic generator's four component (i.e., prize levels 577', conditional probabilities 578', $M_t$ 580', and gate keeper 582') algorithms.

Game generator server 529 CPU 530 also receives this same game prize structure data 576 as well as a secure and authenticated interface—e.g., Secure Socket Layer (SSL), Virtual Private Network (VPN)—to the remote enhancement algorithmic generator server's 526 CPU 527. Preferably, memory in the game generation server 529 is functionally divided into two segments: (i) the standard game generation memory 531 and the (ii) conditional probability memory 532. By functionally dividing memory into these two functional components (531 and 532), the traditional game generation software is minimally impacted and therefore has a lower probability of any bugs being introduced by the added conditional probability algorithm. Optionally, game generation server's 529 CPU 530 may also receive random shuffle seeds from an external hardware TRNG 588. In a preferred embodiment, the random shuffle seeds are digitally signed and originate from a Dallas Semiconductor DS5250 cryptographic microprocessor 588.

After the digital game generation is complete with the conditional probabilities inserted into all appropriate prize levels, the game generation server's 529 CPU 530 will transmit the instant ticket and/or pull-tab indicia (i.e., win or lose imagery and associated barcode with cryptographically secure machine readable win or lose indicia) data through a buffer 532 to printing press imager 585 that physically prints the game's tickets. As part of this printing process, typically the game generation server's 529 CPU 530 will also create validation and ship files 586 that are ultimately transmitted to the ITVMs 535 in the field for play and validation of the printed tickets 585 loaded into the ITVMs 535.

In an alternative embodiment, the conditional probability enhancement feature is reserved for real time conditional probability drawings via some form of random or pseudo-random event (e.g., RNG, player choice). With this embodiment, the conditional probabilities are flagged in the fixed prize fund such that when a fixed prize fund enhanced conditional probability prize tier ticket is drawn by the ITVM 535, the actual conditional probability drawing occurs in real time using its own prize table with a random or pseudorandom event. This embodiment has the advantage of allowing for flexibility of the conditional probability prize fund over time. This flexibility may further include the option for a player to select one of a multiplicity of potential conditional probability prize funds (e.g., higher chance of winning a nominal sum greater than the buy-in thereby appealing to "Grind" players, higher top prize with lower odds thereby appealing to "Punter" and "Jackpot" players) or to even allow the player to elect not to play the conditional prize fund feature and take the buy-in amount as the prize. In a preferred embodiment, this real time conditional drawing feature alters the choices available to the player based on how the conditional probability feature has been historically functioning in the real world. This preferred embodiment thereby has the ability to fine-tune the actual conditional probability payout to be closer to theoretical (e.g., $3\sigma+\Sigma\mu$ in the previous embodiment) as the game progresses.

Figure 6A:
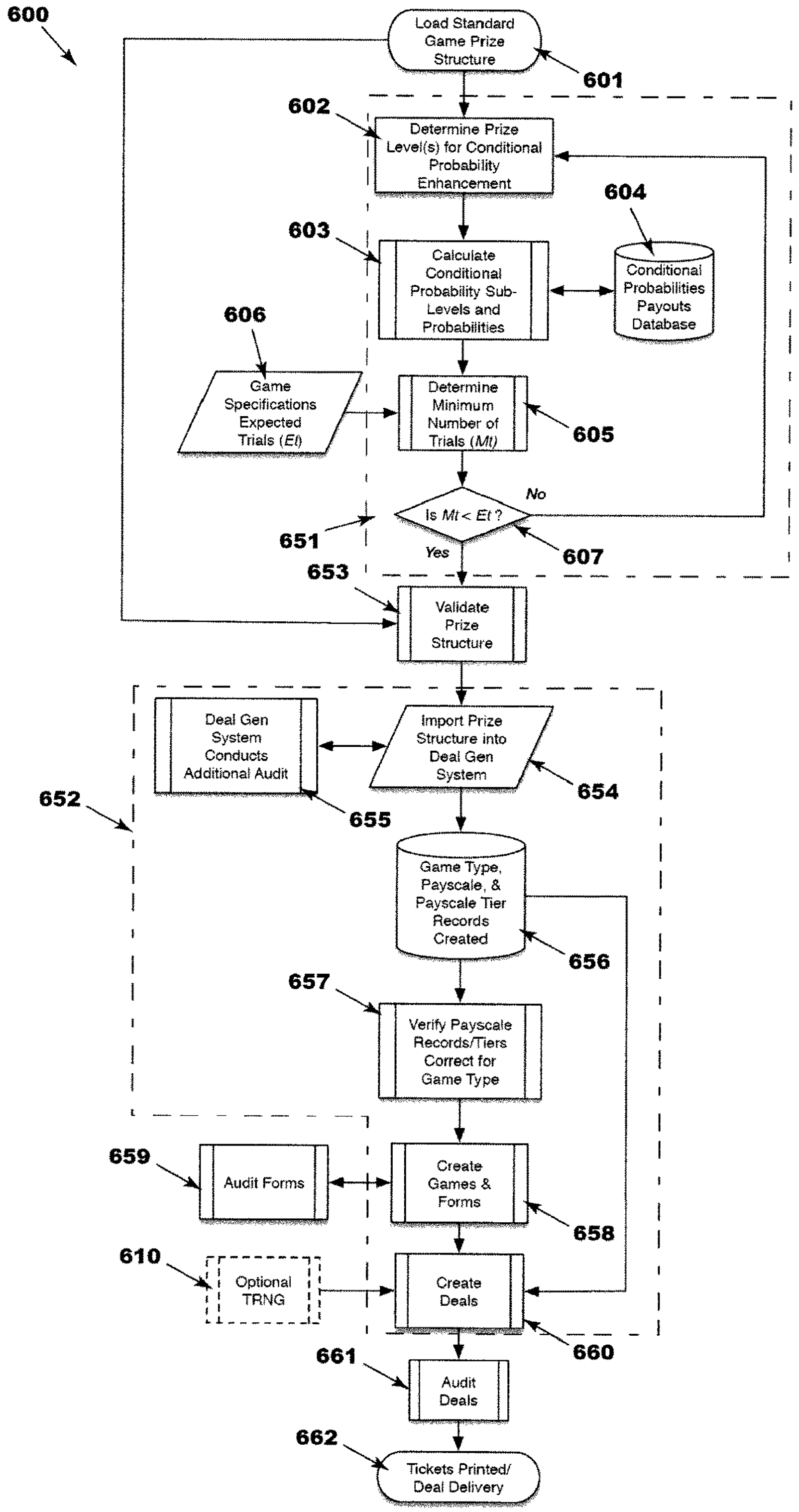
FIG. 6A is a flowchart of a representative example of a conditional probability enhancement generator applied to the static exemplary enhanced prize structure of FIG. 2A.
Figure 6B:
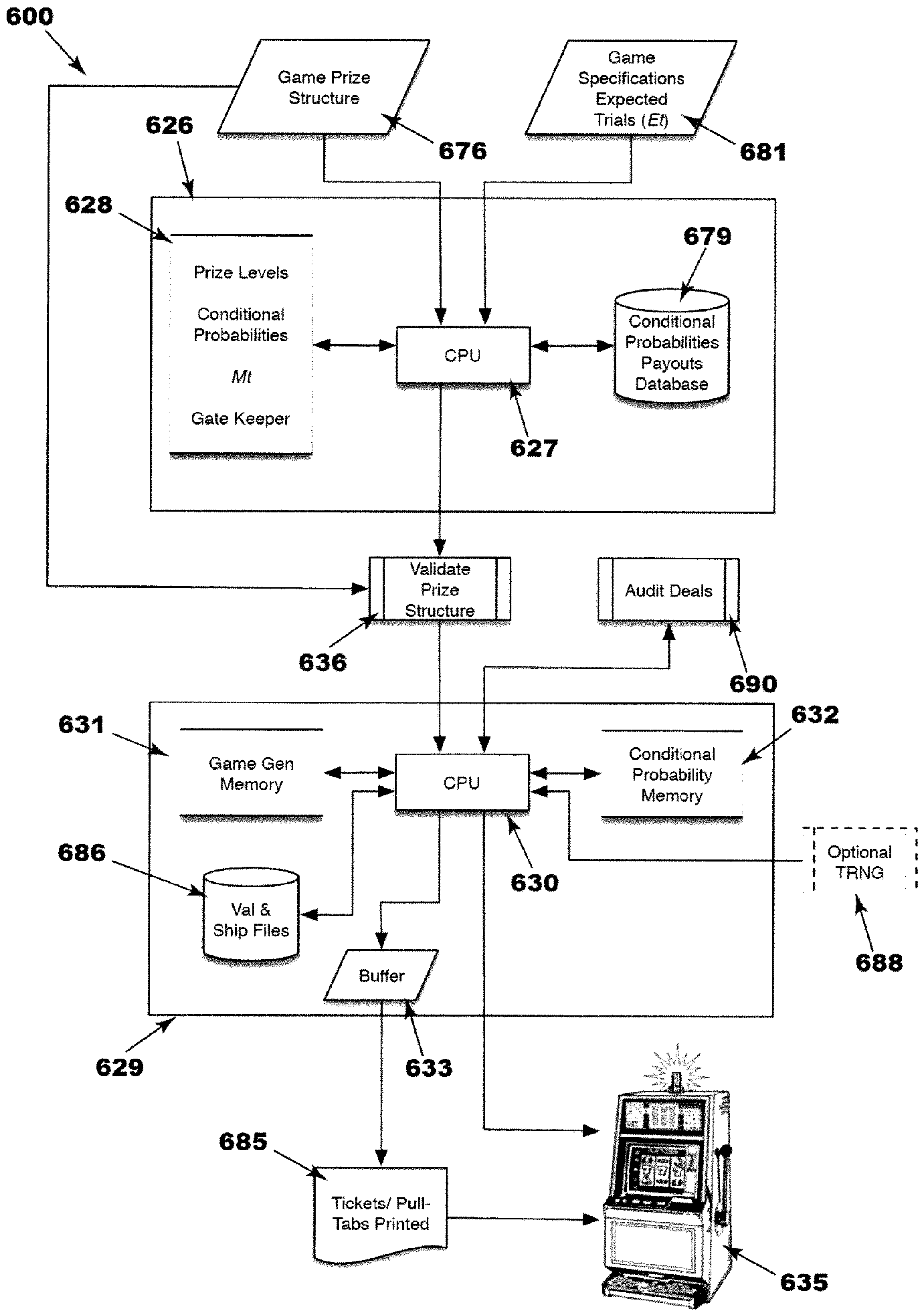
FIG. 6B is a system architecture diagram corresponding to FIG. 6A.

FIGS. 6A and 6B, taken together, illustrate conditional probability enhancement embodiment 600. In these figures, the added functionality unique to conditional probability enhancement is highlighted in dashed area 651 with the typical existing game generation functionality for ticket production highlighted in dashed area 652. FIGS. 6A and 6B illustrate the conventional game generation functionality 652 in greater detail than in FIGS. 5A and 5B.

Referring to FIGS. 6A and 6B, the process begins, as previously, by selecting a game prize structure 601 for conditional probability enhancement and loading the game's prize level data into the enhanced algorithmic generator 602 first component, as well as logging the game prize structure selection in a separate audit program's memory 653. With the prize level(s) for enhancement selected, the second component to the enhancement algorithmic generator 603 calculates the various sub-levels for each prize level selected for enhancement as well as the optimal conditional probabilities for each sub-level. The algorithm ensuring that the sum total of all sub-level probability entries equals unity thereby provides the proper set that is both exhaustive and mutually exclusive. The resulting candidate conditional probabilities payouts are saved to a database 604.

Next, the third component of the enhancement generator 605 algorithmically determines the $M_t$ necessary to provide the acceptable level of risk for providing an enhanced conditional probability payout at a given prize level. In addition to calculating $M_t$, the third component 605 also accepts the $E_t$ as an additional input 606. $E_t$ is supplied in this embodiment by a source outside of the conditional enhancement generator. This source may be from human input or in a preferred embodiment, a separate server, or an application with a unique Application Programming Interface (API) to the enhancement algorithmic generator.

As previously described, the fourth component of the enhancement algorithmic generator 607 functions as a risk assessment gatekeeper by simply testing to determine if $M_t$ is sufficiently less than $E_t$. Once the fourth gatekeeping component is satisfied, the candidate conditional probabilities payouts are promoted to actual probabilities payouts and the calculated payouts are transmitted to a separate audit function 653.

After the conditional probabilities payouts and associated game prize structure are audited and verified 653, the corresponding data is then passed to the game or deal generator portion 652. This portion 652 starts by importing 654 the prize structure and conditional probabilities payouts through an established secure API that authenticates the data, thereby confirming its integrity and origin 655. The authenticated conditional probabilities payouts and associated game prize structure, along with the game type, are then used to create records of all plays in the candidate game 656. This generated game data is then algorithmically verified and audited 657 and passed onto a separate process that generates 658 the forms describing the entire game payout and imaging. These forms are then audited by an external source 659 separate from the game or deal generator portion 652. Assuming the audit is successful, the form data is then utilized to create the actual deals 660 or images that are utilized to print the tickets for the ITVMs with cryptographically secure machine readable variable indicia—preferably in an encrypted machine readable format using a symmetrical encryption algorithm such as the AES. In a preferred optional embodiment, the shuffling of the deals and correspondingly the distribution of prizes is determined from seed data provided from a separate TRNG 610.

Once the deal is generated, a final pre-print audit is conducted 661. After a successful audit is completed 661, the deal data is utilized to print the physical tickets and generate and deliver the ship and validation files that will ultimately be sold and validated on file ITVMs 662.

As before, in the embodiment's 600 associated system architecture diagram FIG. 6B, the four components of the enhancement algorithmic generator preferably reside in a separate server 626 physically located in a different, less secure, area than the standard game generator server 629. This server physical isolation is preferred because multiplicities of personnel may need to access the enhancement algorithmic generator server 626 to update prize structures, $E_t$, conditional probability payout tables, and the like.

The enhancement algorithmic generator server 626 receives game prize structure data 676 from an outside source directly into its CPU 627. Additionally, the enhancement algorithmic generator server 626 CPU 627 receives $E_t$ 681 data. Aside from the CPU 627, the enhancement algorithmic generator server 626 also includes memory 628 as well as a database of conditional probability payouts 679. The memory 628 is sufficient to embody and run the enhancement algorithmic generator's four component algorithms.

Game generator server 629 CPU 630 also receives this same game prize structure data 676 as the enhancement server 626 as well as a secure and authenticated interface to the remote enhancement algorithmic generator server's 626 CPU 627 assuming the conditional probabilities payouts and associated game prize structure are audited and verified 636 successfully. Preferably, memory in the game generation server 629 is functionally divided into two segments, namely, standard game generation memory 631 and conditional probability memory 632. By functionally dividing memory into these two functional components (631 and 632), the traditional game generation software is minimally impacted and therefore has a lower probability of any bugs being introduced by the added conditional probability algorithm. In a preferred embodiment, the prize structure and conditional probabilities are first validated 690 by a third party (e.g., external auditor, audit algorithm) prior to being loaded into game generation server's 629 memory 631 and 632. Optionally, game generation server's 629 CPU 630 may also receive random shuffle seeds from an external hardware TRNG 688.

After the digital game generation is complete with the conditional probabilities inserted into all appropriate prize levels, the game generation server's 629 CPU 630 transmits the instant ticket or pull-tab indicia data through a buffer 633 to printing press imager 685 that physically prints the game's tickets. As part of this printing process, typically the game generation server's 629 CPU 630 will also create validation and ship files 686 that are ultimately transmitted to the ITVMs 635 in the field for play and validation of the printed tickets 685 loaded into the ITVMs 635.

Figure 7A:
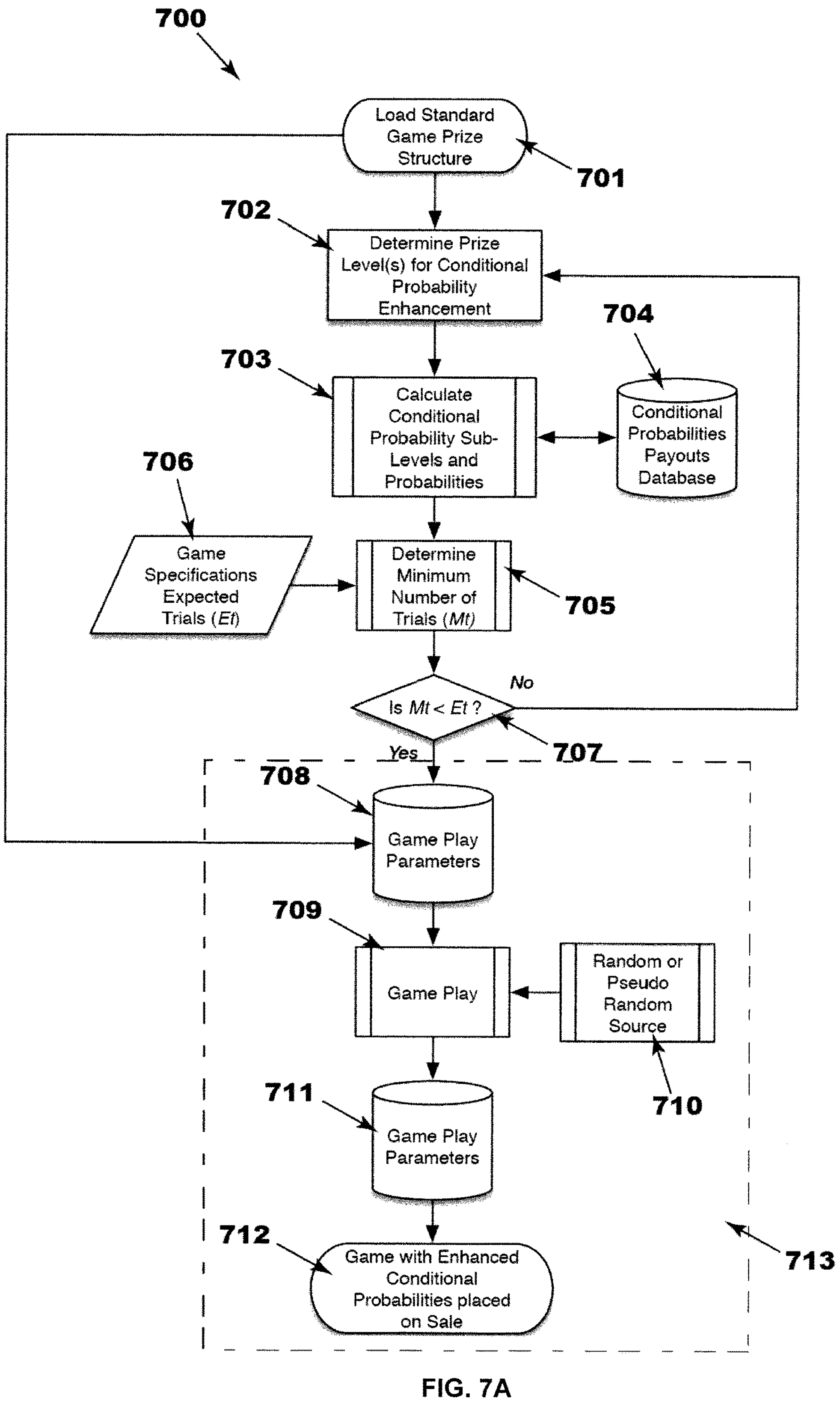
FIG. 7A is a flowchart of a second representative example of a conditional probability enhancement generator applied to a dynamic prize structure.
Figure 7B:
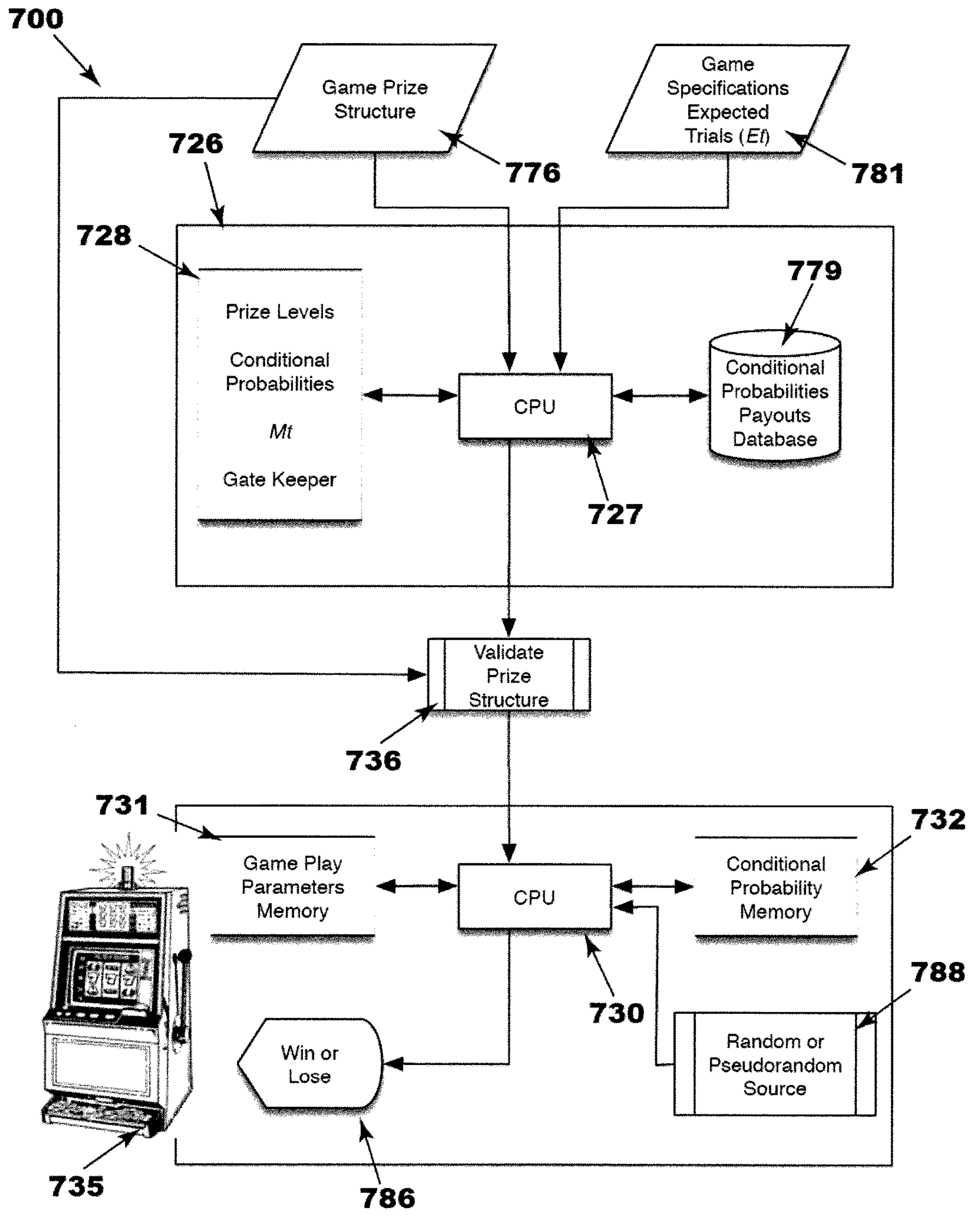
FIG. 7B is a system architecture diagram corresponding to FIG. 7A.

FIGS. 7A and 7B, taken together, illustrate an alternative embodiment 700 that enables dynamic enhanced conditional probability prizes. To clearly differentiate the mechanism for integrating conditional probability enhancements into the standard process for dynamic enhanced conditional probability prizes, the alerted portion for dynamic payout is highlighted in dashed area 713 in FIG. 7A.

As before, the process of FIGS. 7A and 7B begins with selecting a game prize structure 701 for conditional probability enhancement and loading the game's prize level data into the enhanced algorithmic generator 702 first component as well as the database memory for game play 708. Once the prize level(s) for enhancement have been selected, the second component to the enhancement algorithmic generator 703 calculates the various sub-levels for each prize level selected for enhancement, as well as the optimal conditional probabilities for each sub-level. The algorithm ensuring that the sum total of all sub-level probability entries equals unity thereby provides the proper set that is both exhaustive and mutually exclusive. Regardless of how the sub-level prizes and probabilities were determined, the resulting candidate conditional probabilities payouts are saved to a database 704.

The third component of the enhancement algorithmic generator 705 then algorithmically determines the $M_t$ necessary to provide the acceptable level of risk for providing an enhanced conditional probability payout at a given prize level. As before, the actual methodology for determining the enhanced conditional probability acceptable risk can vary. In addition to calculating A, the third component 705 also accepts the $E_t$ as an additional input 706. $E_t$ is determined in this embodiment by the anticipated number of total pulls or plays times the probability of triggering an enhanced prize fund prize tier.

The fourth component of the enhancement algorithmic generator 707 functions, as before, as a risk assessment gatekeeper by simply testing to determine if $M_t$ is less than $E_t$. If not, then the candidate conditional probabilities payouts are discarded and the process repeats itself in a cyclical fashion until candidate conditional probabilities payouts are developed that pass the $M_t<E_t$ test 707. Once the fourth gatekeeping component is satisfied, the candidate conditional probabilities payouts are promoted to actual probabilities payouts and a flag is created for the prize level(s) to be enhanced and passed to the field machine's local memory 708.

Next, the field machine accepts the enhanced conditional probabilities payouts in its database 708. Thus, the machine's basic functionality is not impacted, with the enhanced conditional probability payout only being triggered when the machine 709 selects an enhanced prize level via its drawing 710. This drawing process can vary (e.g., RNG, player choice) the significant point being that the drawing outcome is not determined a priori until the play or pull. When an enhanced conditional probability prize level is selected, the game play parameters 711 for the conditional probability enhanced game are invoked with the conditional probability drawing occurring and the results displayed to the player 712.

This dynamic embodiment's 700 associated system architecture diagram FIG. 7B, four components of the enhancement algorithmic generator reside in a separate server 726 physically located in a central site physically separate from the machines in the field 735. As in the previous embodiments, the enhancement algorithmic generator server 726 receives game prize structure data 776 from an outside source directly into its CPU 727. Additionally, the enhancement algorithmic generator server 726 CPU 727 receives $E_t$ 781 data. As before, the enhancement algorithmic generator server 726 also includes memory 728 as well as a database of conditional probability payouts 779. The memory 728 is sufficient to embody and run the enhancement algorithmic generator's four component algorithms.

Field machine's 735 CPU 730 also receives this same game prize structure data 776. Preferably, memory in the field machine 735 is functionally divided into two segments, namely, standard game generation memory 731 and conditional probability memory 732. By functionally dividing memory into these two functional components (731 and 732), the traditional game generation software is minimally impacted and therefore has a lower probability of any bugs being introduced by the added conditional probability algorithm. In a preferred embodiment, the prize structure and conditional probabilities are first validated 736 by a third party (e.g., external auditor, audit algorithm) prior to being loaded into field machine's 735 memory 731 and 732.

When play is initiated on field machine 735, random or pseudorandom data from a source 788 (e.g., RNG, human interaction) is used to determine the particular play's outcome 786. In the event a winning tier was selected associated with a conditional probability enhancement, the conditional probability algorithm is executed in its partitioned memory 732 with its outcome determined, real time, by a RNG or other random or pseudorandom source.

Figure 8A:
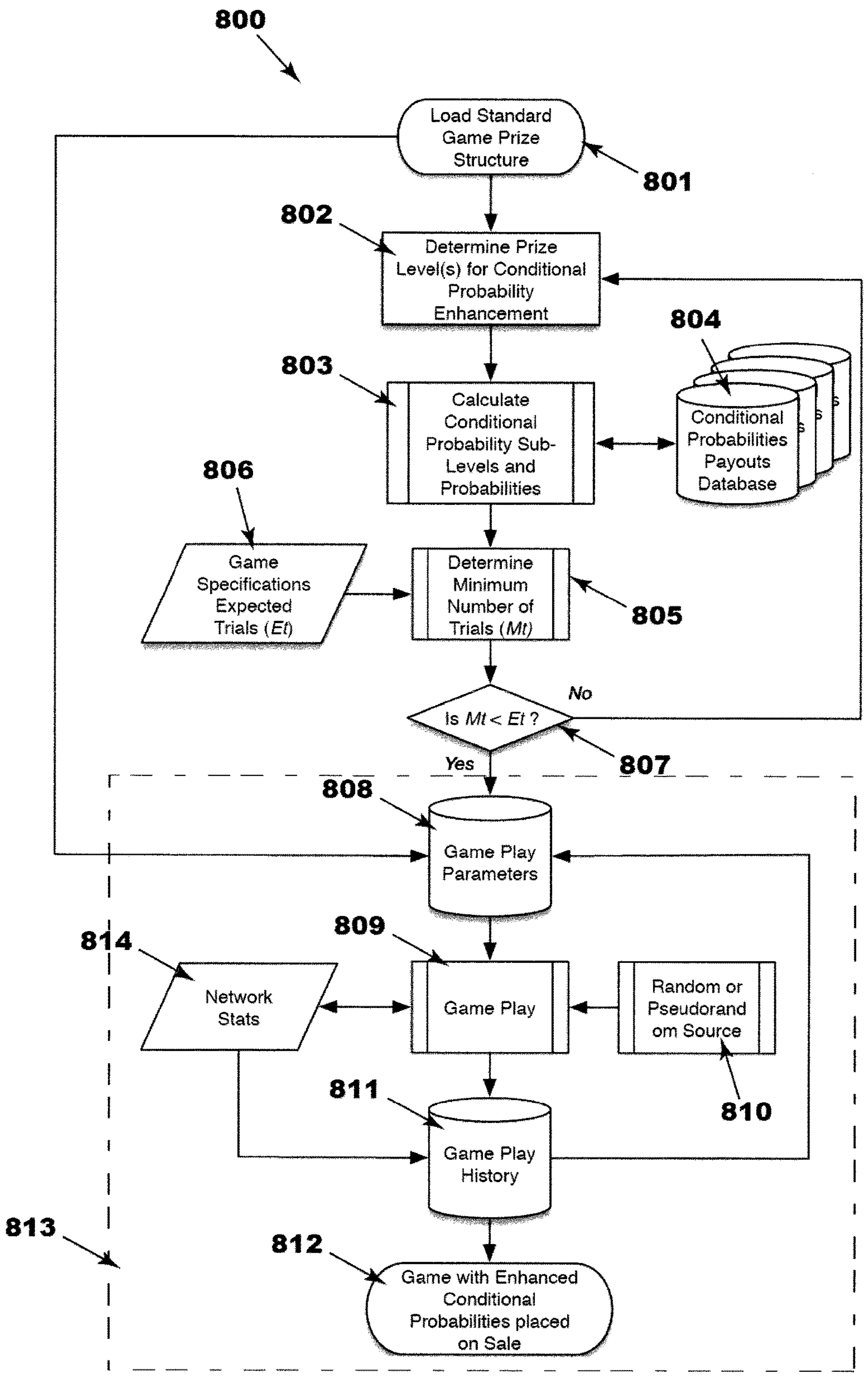
FIG. 8A is a flowchart of a third representative example of a conditional probability enhancement generator with the incorporation of a feedback loop enabling dynamic or fluid reallocation of prize sub-levels; and, FIG. 8B is a system architecture diagram corresponding to FIG. 8A.
Figure 8B:
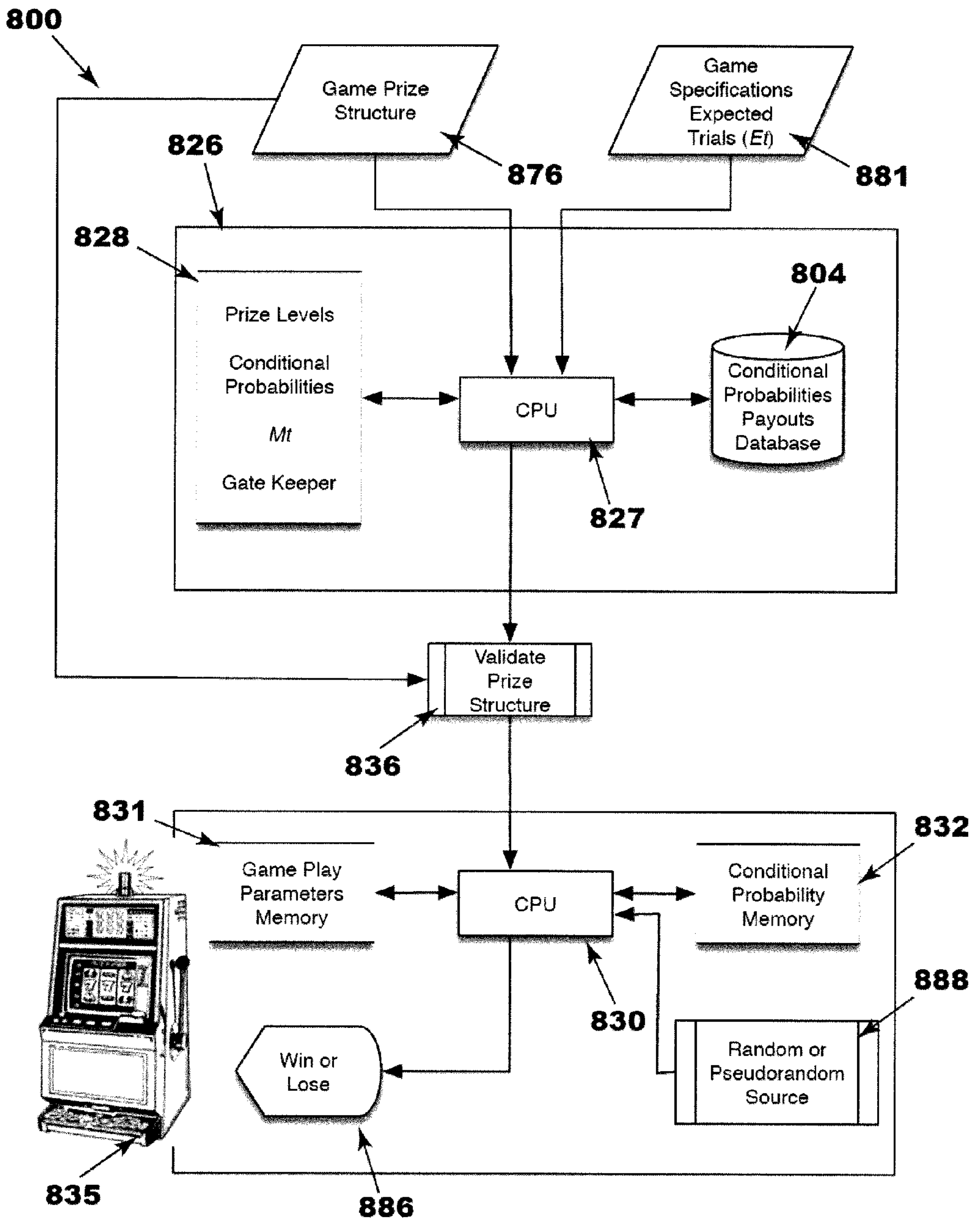

If feedback is added to the previous embodiment, the resulting preferred embodiment 800 of FIGS. 8A and 8B results thereby enables the enhanced conditional probability prize feature to become dynamic with respect to cumulative player actions. As before, the process of FIG. 8A begins with selecting a game prize structure 801 for conditional probability enhancement and loading the game's prize level data into the enhanced algorithmic generator 802 first component as well as the database memory 808 for field machines 835.

Once the prize level(s) for enhancement have been selected, the various sub-levels and associated probabilities for each prize level selected are calculated as before. However, in this preferred embodiment multiplicities of sub-level probabilities pairs are generated 804 for each enhancement, thereby creating options for field game play deltas when real world feedback is available.

Aside from developing multiplicities of sub-level probabilities pairs 804, the basic process for conditional probability enhancement remains the same through the fourth component functioning as a risk assessment gatekeeper by testing that $M_t < E_t$ 807. Once the fourth gatekeeping component is satisfied, the candidate conditional probabilities payouts are promoted to actual probabilities payouts and a flag is created for the prize level(s) to be enhanced and passed to the field machine's local database 808.

As before, the field machine 835 accepts the enhanced conditional probabilities payouts in its database 808 along with the normal prize structure 801. Once this data is loaded into the machine's 835 game play parameter database 808, the game can be made active and placed on sale 812. As before, the enhanced conditional probability payout is only triggered when the game play portion of the machine 809 selects an enhanced prize via its localized random or pseudorandom event (e.g., RNG, player choice) 810. Whenever that occurs, the game play parameters 808 for the conditional probability enhanced game is invoked. However, in this preferred embodiment, network statistics 814 and/or local machine game play history 325 are evaluated to determine which enhanced controlled probability prize fund from the database 811 should be employed for the conditional probability drawing. The overriding concept is to ensure that the actual payout for multiplicities of games remains in the boundaries of the previously calculated acceptable risk (e.g., $3\sigma+\Sigma\mu$ as described in a previous embodiment).

To clearly differentiate the mechanism for integrating conditional probability enhancements into the standard process for dynamic enhanced conditional probability prizes, the alerted portion for dynamic payout is highlighted in dashed area 813 in FIG. 8A.

As before, this dynamic feedback embodiment's 800 associated system architecture diagram FIG. 8B, four components of the enhancement algorithmic generator reside in a separate server 826 physically located in a central site physically separate from the machines in the field 835. As in the previous embodiments, the enhancement algorithmic generator server 826 receives game prize structure data 876 from an outside source directly into its CPU 827. Additionally, the enhancement algorithmic generator server 826 CPU 827 receives $E_t$ 881 data. As before, the enhancement algorithmic generator server 826 also includes memory 828 as well as a database of conditional probability payouts 804. The memory 828 is sufficient to embody and run the enhancement algorithmic generator's four component algorithms.

Field machine's 835 CPU 830 also receives this same game prize structure data 876. Memory in the field machine 835 is functionally divided into two segments, namely, standard game generation memory 831 and conditional probability memory 832. By functionally dividing memory into these two functional components (831 and 832), the traditional game generation software is minimally impacted and therefore has a lower probability of any bugs being introduced by the added conditional probability algorithm. In a preferred embodiment, the prize structure and conditional probabilities are first validated 836 by a third party (e.g., external auditor, audit algorithm) prior to being loaded into field machine's 835 memory 831 and 732. Game play parameters are stored in either the standard game generation memory 831 or the conditional probability memory 832 depending on which portion the parameters impacts.

When play is initiated on field machine 835, random or pseudorandom data from a source 888 (e.g., RNG, human interaction) is used to determine the particular play's outcome 886. In the event a winning tier was selected associated with a conditional probability enhancement, the conditional probability algorithm is executed in its partitioned memory 832 with its outcome determined, real time, by a RNG or other random/pseudorandom source.

In a preferred embodiment, this dynamic feedback feature alters the choices available to the player based on how the conditional probability feature has been historically functioning in the real world. This preferred embodiment thereby has the ability to fine-tune the actual conditional probability payout to be closer to theoretical (e.g., $3\sigma+\Sigma\mu$ in the previous embodiment) as the game progresses.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method of providing variable jackpot tickets for a game defined by a plurality of tickets that are preprinted with game content and which are associated with a deal of tickets, the deal of tickets including (i) a plurality of predetermined non-jackpot winning tickets, and (ii) a plurality of variable jackpot tickets, and wherein the plurality of variable jackpot tickets have a predefined expected value, the method comprising:

(a) executing a first random number generation using a first random number generator to select physical locations in the deal of tickets for (i) the plurality of predetermined non-jackpot winning tickets, and (ii) the plurality of variable jackpot tickets, wherein the first random number generator uses a first prize table for the selection; and (b) executing a second random number generation using a second random number generator to select a jackpot prize for each of the plurality of variable jackpot tickets, wherein the second random number generator uses a second prize table for the selection which is different than the first prize table, the second prize table including jackpot prizes, wherein some of the jackpot prizes in the second prize table are less than the expected value, the difference between some of the jackpot prizes in the second prize table and the expected value being used to fund one or more jackpot prizes that are greater than the expected value.

2. The method of claim 1 wherein the variable jackpot ticket is preprinted with jackpot indicia but no corresponding jackpot prize, and wherein step (b) occurs after ticket printing and when a player wins a variable jackpot ticket.

3. The method of claim 2 wherein the tickets are purchased from an instant ticket vending machine, the method further comprising:

(c) the instant ticket vending machine electronically detecting variable jackpot tickets, and wherein step (b) is initiated by the instant ticket vending machine upon detection of a variable jackpot ticket.

4. The method of claim 3 wherein the instant ticket vending machine includes the second random number generator and the second prize table, and wherein step (b) is initiated and performed by the instant ticket vending machine.

5. The method of claim 1 wherein most of the jackpot prizes in the second prize table are less than the expected value, the difference between most of the jackpot prizes in the second prize table and the expected value being used to fund one or more jackpot prizes that are significantly greater than the expected value.

6. The method of claim 5 wherein the highest jackpot prize is at least one order of magnitude greater than the lowest jackpot prize.

7. The method of claim 1 wherein each variable jackpot ticket is preprinted with (i) jackpot indicia, and (ii) the jackpot prize in a cryptographically secure machine readable format, and wherein step (b) occurs prior to ticket printing.

8. The method of claim 1 wherein the first random number generator is the same as the second random number generator.

9. A system that provides variable jackpot tickets for a game defined by a plurality of tickets that are preprinted with game content and which are associated with a deal of tickets, the deal of tickets including (i) a plurality of predetermined non-jackpot winning tickets, and (ii) a plurality of variable jackpot tickets, and wherein the plurality of variable jackpot tickets have a predefined expected value, the system comprising:

(a) a first random number generator that executes a first random number generation to select physical locations in the deal of tickets for (i) the plurality of predetermined non-jackpot winning tickets, and (ii) the plurality of variable jackpot tickets, wherein the first random number generator uses a first prize table for the selection; and (b) a second random number generator that executes a second random number generation to select a jackpot prize for each of the plurality of variable jackpot tickets, wherein the second random number generator uses a second prize table for the selection which is different than the first prize table, the second prize table including jackpot prizes, wherein some of the jackpot prizes in the second prize table are less than the expected value, the difference between some of the jackpot prizes in the second prize table and the expected value being used to fund one or more jackpot prizes that are greater than the expected value.

10. The system of claim 9 wherein the second random number generation occurs after ticket printing and when a player wins a variable jackpot ticket, the variable jackpot ticket being preprinted with jackpot indicia but no corresponding jackpot prize.

11. The system of claim 10 further comprising:

(c) an instant ticket vending machine that (i) allows for purchase of the tickets, (ii) electronically detects variable jackpot tickets, and initiates the second random number generation upon detection of a variable jackpot ticket.

12. The system of claim 11 wherein the instant ticket vending machine includes the second random number generator and the second prize table, and wherein the second random number generation is initiated and performed by the instant ticket vending machine.

13. The system of claim 9 wherein most of the jackpot prizes in the second prize table are less than the expected value, the difference between most of the jackpot prizes in the second prize table and the expected value being used to fund one or more jackpot prizes that are significantly greater than the expected value.

14. The system of claim 13 wherein the highest jackpot prize is at least one order of magnitude greater than the lowest jackpot prize.

15. The system of claim 9 wherein the second random number generation occurs prior to ticket printing and each variable jackpot ticket is preprinted with (i) jackpot indicia, and (ii) the jackpot prize in a cryptographically secure machine readable format.

16. The system of claim 9 wherein the first random number generator is the same as the second random number generator.

17. A method of providing variable jackpot tickets for a game defined by a plurality of tickets that are purchased from an instant ticket vending machine and are preprinted with game content and which are associated with a deal of tickets, the deal of tickets including (i) a plurality of predetermined non-jackpot winning tickets, and (ii) a plurality of variable jackpot tickets, and wherein the plurality of variable jackpot tickets have a predefined expected value, the method comprising:

(a) executing a first random number generation using a first random number generator to select physical locations in the deal of tickets for (i) the plurality of predetermined non-jackpot winning tickets, and (ii) the plurality of variable jackpot tickets, wherein the first random number generator uses a first prize table for the selection; and (b) a player purchasing one of the preprinted tickets and upon receiving a variable jackpot ticket, selecting one of the following options provided by the instant ticket vending machine:

(i) redeeming the variable jackpot ticket for a jackpot prize which is similar in magnitude to the expected value; or (ii) redeeming the variable jackpot ticket for a jackpot prize that is potentially greater than the expected value, and which is determined by executing a second random number generation using a second random number generator using a second prize table for the selection which is different than the first prize table, the second prize table including jackpot prizes, wherein some of the jackpot prizes in the second prize table are less than the expected value, the difference between some of the jackpot prizes in the second prize table and the expected value being used to fund one or more jackpot prizes that are greater than the expected value.

18. The method of claim 17 wherein most of the jackpot prizes in the second prize table are less than the expected value, the difference between most of the jackpot prizes in the second prize table and the expected value being used to fund one or more jackpot prizes that are significantly greater than the expected value.

19. The method of claim 18 wherein the highest jackpot prize is at least one order of magnitude greater than the lowest jackpot prize.

20. The method of claim 17 wherein each variable jackpot ticket is preprinted with (i) jackpot indicia, and (ii) the jackpot prize in a cryptographically secure machine-readable format.

21. The method of claim 17 wherein the variable jackpot ticket is preprinted with jackpot indicia but no corresponding jackpot prize, and wherein the second random number generation occurs after ticket printing and when a player wins a variable jackpot ticket and selects the option to redeem the variable jackpot ticket for a jackpot prize that is potentially greater than the expected value.

22. The method of claim 17 wherein the instant ticket vending machine includes the second random number generator and the second prize table, and wherein step (b)(ii) is performed by the instant ticket vending machine.

23. The method of claim 17 wherein the first random number generator is the same as the second random number generator.

24. A system that provides variable jackpot tickets for a game defined by a plurality of tickets which are preprinted with game content and which are associated with a deal of tickets, the deal of tickets including (i) a plurality of predetermined non-jackpot winning tickets, and (ii) a plurality of variable jackpot tickets, and wherein the plurality of variable jackpot tickets have a predefined expected value, the system comprising:

(a) a first prize table;

(b) a second prize table which is different than the first prize table the second prize table including jackpot prizes;

(c) a first random number generator that executes a first random number generation to select physical locations in the deal of tickets for (i) the plurality of predetermined non-jackpot winning tickets, and (ii) the plurality of variable jackpot tickets, wherein the first random number generator uses a first prize table for the selection;

(d) a second random number generator that executes a second random number generation to select the jackpot prize for at least some of the plurality of variable jackpot tickets, wherein the second random number generator uses the second prize table for the selection; and (e) an instant ticket vending machine for purchasing the preprinted tickets, the instant ticket vending machine including:

(i) a first selection option to redeem a variable jackpot ticket for a jackpot prize which is similar in magnitude to the expected value, and (ii) a second selection option to redeem a variable jackpot ticket for a jackpot prize that is potentially greater than the expected value, and which is determined by the second random number generator using the second prize table, wherein some of the jackpot prizes in the second prize table are less than the expected value, the difference between some of the jackpot prizes in the second prize table and the expected value being used to fund one or more jackpot prizes that are greater than the expected value.

25. The system of claim 24 wherein most of the jackpot prizes in the second prize table are less than the expected value, the difference between most of the jackpot prizes in the second prize table and the expected value being used to fund one or more jackpot prizes that are significantly greater than the expected value.

26. The system of claim 25 wherein the highest jackpot prize is at least one order of magnitude greater than the lowest jackpot prize.

27. The system of claim 24 wherein each variable jackpot ticket is preprinted with (i) jackpot indicia, and (ii) the jackpot prize in a cryptographically secure machine readable format.

28. The system of claim 24 wherein the variable jackpot ticket is preprinted with jackpot indicia but no corresponding jackpot prize, and wherein the second random number generation occurs after ticket printing and when a player wins a variable jackpot ticket and selects the option to redeem the variable jackpot ticket for a jackpot prize that is potentially greater than the expected value.

29. The system of claim 24 wherein the instant ticket vending machine includes the second random number generator and the second prize table, and wherein the second random number generation is performed by the instant ticket vending machine.

30. The system of claim 24 wherein the first random number generator is the same as the second random number generator.

* * * * *